(12) United States Patent
Shinzaki

(10) Patent No.: US 6,978,024 B2
(45) Date of Patent: Dec. 20, 2005

(54) PUBLICATION CERTIFYING SYSTEM, VIEWING-ACCESS-LOG RECORDING SERVER, PUBLISHING-ACCESS-LOG RECORDING SERVER, DIGITAL-SIGNATURE SERVER, AND INFORMATION TERMINAL FOR ACCESS-TO-VIEW

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 09/862,433

(22) Filed: May 23, 2001

(65) Prior Publication Data

US 2002/0101994 A1   Aug. 1, 2002

(30) Foreign Application Priority Data

Dec. 4, 2000   (JP) .............................. 2000-368514

(51) Int. Cl.[7] .............................. H04L 9/00; G06F 15/16
(52) U.S. Cl. ...................... 380/277; 380/255; 713/201; 713/175; 713/156; 709/229; 709/224; 709/219; 709/217
(58) Field of Search ................................ 709/229, 224, 709/219; 380/255; 707/10

(56) References Cited

U.S. PATENT DOCUMENTS

| 5,799,284 | A | * | 8/1998 | Bourquin ..................... 705/26 |
| 5,848,413 | A | * | 12/1998 | Wolff .......................... 707/10 |
| 6,018,619 | A | * | 1/2000 | Allard et al. ............... 709/224 |
| 6,148,333 | A | * | 11/2000 | Guedalia et al. ........... 709/219 |
| 6,542,933 | B1 | * | 4/2003 | Durst et al. ................ 709/229 |
| 6,574,609 | B1 | * | 6/2003 | Downs et al. ............. 380/255 |
| 6,714,992 | B1 | * | 3/2004 | Kanojia et al. ............ 719/321 |

* cited by examiner

Primary Examiner—Gilberto Barron, Jr.
Assistant Examiner—A. Nobahar
(74) Attorney, Agent, or Firm—Staas & Halsey LLP

(57) ABSTRACT

A system can certify that electronic data has been notified and published on a network. The system comprise an information providing server having a published information storing function and a published information bulletin function, and a viewing-access-log recording server having a data trapping function and a data storing function. The system is widely used as a service certifying that various information from a company has been notified and published as electronic data on the communication network, or that various technical information has been published as electronic data on the communication network to be public knowledge.

25 Claims, 18 Drawing Sheets

FIG. 2

| ACCESS DATE (DAY/MONTH/YEAR) |
|---|
| ACCESS TIME |
| DOMAIN INFORMATION |
| REMOTE HOST INFORMATION |
| BROWSER NAME INFORMATION |
| REFERENCE DIRECTORY INFORMATION |

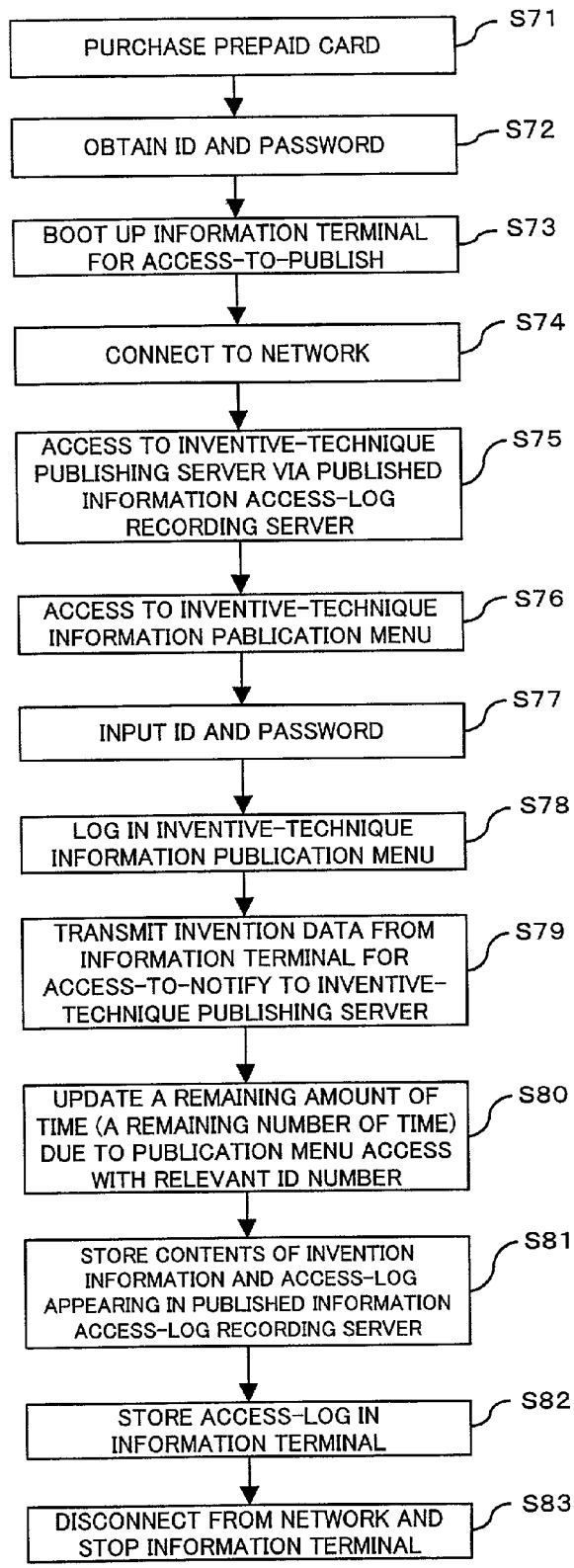

PUBLICATION CERTIFYING SYSTEM, VIEWING-ACCESS-LOG RECORDING SERVER, PUBLISHING-ACCESS-LOG RECORDING SERVER, DIGITAL-SIGNATURE SERVER, AND INFORMATION TERMINAL FOR ACCESS-TO-VIEW

BACKGROUND OF THE INVENTION

1) Field of the Invention

The present invention relates to a publication certifying system, a viewing-access-log recording server, a publishing-access-log recording server, a digital-signature server, and an information terminal for access-to-view for use to certify that electronic data has been stored in a viewable and accessible state by a third party on a communication network, that is, the electronic data has been published to the third party on the communication network. The present invention can be widely used as a means (service) for certifying that various information (for example, product fault information, product call-back information, etc. relating to recall) from a company has been notified and laid open on a communication network, or that various technical information has been published as electronic data on a communication network.

2) Description of Related Art

It becomes general in these years that information is notified and published as electronic data on the Internet [for example, the WWW (World Wide Web)] instead of disclosing the information on a printed matter such as a paper.

More concretely, a person who desires to notify information accesses to an information providing server over the Internet from an information terminal such as a personal computer or the like, and transmits the information desired to be published on the information providing server to store the information in a state in which the information can be accessed from the outside in the information providing server. A third party can view the electronic data stored in the information providing server only by accessing to the information server over the Internet from an information terminal such as a personal computer or the like.

Meanwhile, a digital signature technique that is a combination of a public key encryption technique and a message-digest creation technique starts to be used in recent years in order to certify when electronic data has been created.

When a range of examples known in the public involves information published on the Internet in patent examination, or when a company notifies product fault information, product call-back information and the like relating to recall on the WWW, it is necessary to not only certify a date/time at which electronic data of the information has been created but also certify that the electronic data has been notified and published in a place (server) readily accessible from a third party, or certify a period in which the electronic data has been notified and published.

For instance, it is relatively easy to certify that information on magazines and the like has been published since most of all the magazines and the like are saved in the National Diet Library. On the contrary, it is difficult to certify a date/time (period) at which electronic data has been notified and published in a state in which a third party can view the electronic data on a communication network. In present, a method or system for certifying publication of electronic data on a communication network is not established, there is thus a strong demand for development of a method or system therefor.

SUMMARY OF THE INVENTION

In the light of the above problem, an object of this invention is to certify that various information has been, as electronic data, in a state where anyone can access to the information on a communication network, that is, the electronic data has been notified and published on the communication network, thereby giving admissibility similar to that of a printed matter or a published matter to the information notified and published on the communication network.

The present invention therefore provides a publication certifying system comprising an information providing server comprising a published information storing function of storing published information to be provided as electronic data, and a published information bulletin function of providing the published information to an information terminal accessing over a communication network in order to view the published information, and a viewing-access-log recording server comprising a viewing-access-log obtaining function of obtaining the published information viewed on the information terminal over the communication network and an access date/time to the published information as a viewing-access-log, and a viewing-access-log storing function of storing the viewing-access-log obtained by the viewing-access-log obtaining function.

The present invention further provides a viewing-access-log recording server comprising a viewing-access-log obtaining function of obtaining published information viewed over a communication network and an access date/time to the published information as a viewing-access-log, and a viewing-access-log storing function of storing the viewing-access-log obtained by the viewing-access-log obtaining function.

The present invention still further provides a publishing-access-log recording server comprising a publishing-access-log obtaining function of obtaining information transmitted to and published in an information providing server over a communication network and a publishing date/time of the information as a publishing-access-log, and a publishing-access-log storing function of storing the publishing-access-log obtained by the publishing-access-log obtaining function.

The present invention still further provides a digital-signature server configuring a publication certifying system with the above information providing server and the viewing-access-log recording server, comprising a time-stamp adding function of adding a time stamp to the viewing-access-log, and an enciphering function of enciphering the viewing-access-log added the time stamp using a secret key of the digital-signature server to put a digital signature to the time-stamped viewing-access-log.

The present invention still further provides an information terminal for access-to-view configuring a publication certifying system with the above information providing server and the above viewing-access-log recording server, the information terminal periodically having an access of viewing the published information in the information providing server in order to intentionally leave a log of the access of viewing the published information in the viewing-access-log recording server.

As described above, the publication certifying system, the viewing-access-log recording server, the publishing-access-log recording server, the digital-signature server and the information terminal for access-to-view according to this invention provide the following effects or advantages:

(1) In the publication certifying system or the viewing-access-log recording server of this invention, when a third party accesses to published information from the information terminal over a communication network in order to view the published information stored in the information providing server, the published information is provided to the third part by the published information bulletin function. At this time, the published information viewed by the third party and an access date/time to the published information are obtained and stored as a viewing-access-log in the viewing-access-log recording server.

Since contents and a viewing date/time of published information viewed by the third party are recorded as a viewing-access-log as above, the publication history of the published information can be stored in a provable form by the viewing-access-log. It is thus possible to certify that the published information has been, as electronic data, in a state in which anyone can access thereto on the communication network at least at viewing date/time, that is, the electronic data has been notified and published on the communication network. Consequently, it is possible to give admissibility similar to that of a printed matter or a published matter to information published on a communication network.

(2) When a person who desires to publish information transmits the information to the information providing server over a communication network to publish it, the information notified and published by the person who desires to publish and a publishing date/time of the information are recorded as a publishing-access-log in the publishing-access-log recording server of this invention. It is thus possible to store a publishing history of the published information in a certifiable form by the publishing-access-log, and certify that the published information has been, as electronic data, in a state in which anyone can access thereto on the communication network after the publishing date/time, that is, the electronic data has been notified and published on the communication network. It is therefore possible to give admissibility similar to that of a printed matter or a published matter to information published on a communication network.

(3) In the digital-signature server of an electronic notary company or the like that is a third party, a digital signature is put, using a secret key of the digital-signature server, to a time-stamped viewing-access-log obtained by the viewing-access-log recording server. It is thereby possible to certainly prevent the viewing-access-log from being altered. Since a date and time almost corresponding to the viewing time is added as a time stamp, it is possible to more raise admissibility of the viewing-access-log, that is, reliability of the viewing-access-log as evidence.

(4) The information terminal for access-to-view periodically has a viewing access to published information, whereby a viewing access to the published information is recorded and stored periodically and automatically in the viewing-access-log recording server. Even when there is no access to the published information from a third party, it is possible to certainly prove that the published information has been, as electronic data, in a state in which anyone can access to the published information on a communication network, that is, the electronic data has been notified and published on the communication network, in at least a viewing access term by the information terminal for access-to-view if the term is predetermined. It is thus possible to give admissibility similar to that of a printed matter or a published matter to information notified and published on the communication network.

(5) It becomes possible to give admissibility similar to that of a printed matter or a published matter to electronic data, whereby the electronic data published on the communication network can be adopted as an example of public knowledge in term of patent. Accordingly, it is possible to decrease a cost of patent applications by a company, which increases with overheating, trifling patent competition, and eliminate a wasteful load on the patent office.

(6) Since it becomes possible to give admissibility similar to that of a printed matter or a published matter to electronic data as above, the following significance can be provided in business:

(6-1) A service of not only electronic notary, but also disclosure recording of information disclosure, or certifying that information has been accessible can be provided, so that possibility of creating new business is largely extended.

(6-2) By a service of anonymously publishing a new technique, a client company can lay open the new technique as public knowledge information without revealing a development trend of the company. It is therefore possible to prevent a technique that is vague to be granted a patent or not from being applied unreasonably, thus to decrease a cost of patent applications.

(6-3) It is possible to largely shorten a time required until release (time required until information is laid open) as compared with a general printed matter of technical laid-open publication. For this, it is possible to lessen a risk that the other applies the similar idea while the information is prepared to be published.

(7) By providing a service of certifying a date/time when electronic data has been published on a communication network in a state where a third party can view, the electronic data can be used as evidence in various aspects.

(8) Since terminal information on an information terminal having accessed to published information is obtained and stored as a viewing-access-log, it is possible to specify which information terminal has had a viewing access to the published information and which route is used for the viewing access on the basis of the terminal information included in the viewing-access-log, which in turn can raises admissibility of the viewing-access-log.

(9) Since a message digest of published information is created and stored as published information in a viewing-access-log, it is possible to efficiently use a storage area of a hard disk or the like for actually storing the viewing-access-log.

(10) One server is used as both the information providing server and the viewing-access-log recording server, it becomes unnecessary to prepare two kinds of servers separately, which allows a simple structure of the publication certifying system.

(11) Since a viewing-access-log is put a digital signature and stored in the viewing-access-log recording server, it is possible to certainly prevent the viewing-access-log from being altered, which can raise admissibility of the viewing-access-log.

(12) By locating a plurality of the information terminals for access-to-view in a plurality of countries, respectively, it is possible to certainly leave evidence (viewing-access-log) that published information in the information providing server has been able to be accessed to be viewed from a plurality of countries.

(13) Since the information terminal for access-to-view has a viewing access via a server of an Internet service provider, not only a viewing-access-log but also an access record is automatically left in the server of the provider. It is thus possible to leave access information with higher reliability.

(14) A function as the viewing-access-log recording server is incorporated in a proxy server of an Internet service provider. Whereby, it is possible for the information terminal to easily use the publication certifying system of this invention only by changing a proxy server designated by Internet browser software generally used in the information terminal to a proxy server having a function as the viewing-access-log recording server. The Internet service provider can thereby readily provide a new service.

(15) A person who desires to publish information transmits identification information and a password beforehand given to the person to the information providing server over a communication network, and the information providing server confirms the person on the basis of the identification information and the password, then publishes the information as published information. The information providing server can manage an access to publish the information using the identification information and the password. It is thereby possible to readily provide such a new information publishing service as to collect fee for each piece of published information, for example.

(16) The identification information and the password are described on a prepaid card purchased by a person who desires to publish. A remaining amount of time of the prepaid card is made correspond to a number of times information is published in the information providing server, and fee for publishing information is collected. It is thereby possible to publish the information in the information providing server while assuring high anonymity of a person who desires to notify, thus possible to provide an anonymous information publishing service.

(17) The viewing-access-log recording server also fulfills a function as the publishing-access-log recording server, the viewing-access-log obtaining function functions as the publishing-access-log obtaining function, and the viewing-access-log storing function functions as the publishing-access-log storing function. Whereby, it becomes unnecessary to prepare two kinds of servers, separately, which allows a simple structure of the publication certifying system.

(18) The viewing-access-log storing function of the viewing-access-log recording server stores published information included in a viewing-access-log in a compressed state, so that a storage area of a hard disk or the like for actually storing the viewing access can be efficiently used.

BRIEF DESCRIPTION OF THE DRAWINGS

FIG. 2 is a diagram for illustrating an example of access-log obtained and stored according to the embodiment;

FIG. 18 is a flowchart for illustrating an operation of the modification according to the sixth embodiment.

DESCRIPTION OF THE PREFERRED EMBODIMENTS

Hereinafter, description will be made of embodiments of the present invention with reference to the drawings.

[1] Description of First Embodiment

Figure 1:
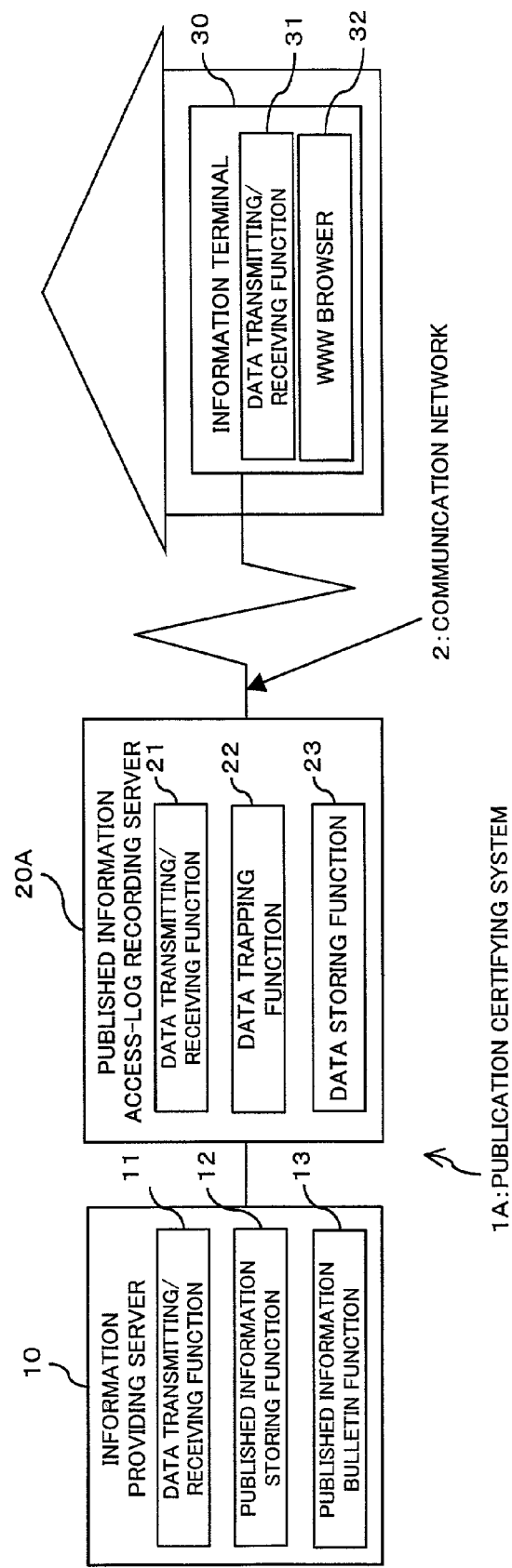
FIG. 1 is a block diagram showing a publication certifying system according to a first embodiment of this invention.

FIG. 1 is a block diagram showing a structure of a publication certifying system according to a first embodiment of this invention. As shown in FIG. 1, the publication certifying system 1A according to the first embodiment comprises an information providing server 10, a published information access-log recording server (viewing-access-log recording server) 20A.

The information providing server 10 provides published information to an information terminal 30 over a communication network 2, which comprises a data transmitting/receiving function 11, a published information storing function 12 and a published information bulletin function 13 to be described later. Incidentally, this embodiment will be described by way of example where the communication network 2 is the WWW (World Wide Web) configured on the Internet.

The published information access-log recording server 20A is disposed between the information providing server 10 and the information terminal 30 on the communication network 2, which comprises a data transmitting/receiving function 21, a data trapping function 22 and a data storing function 23 to be described later in order to record an access-log to the information providing server 10 (published information) by the information terminal 30. According to this embodiment, data groups transmitted/received between the information providing server 10 and the information terminal 30 are transmitted via or pass through the published information access-log recording server 20A.

In the information providing server 10, the data transmitting/receiving function 11 transmits information to the published information access-log recording server 20A and receives information from the published information access-log recording server 20A over the communication network 2.

The published information storing function 12 stores published information to be provided as electronic data.

In order to provide published information to the information terminal 30 accessing to the published information bulletin function 13 over the communication network to view the published information, the published information bulletin function 13 reads published information (electronic data) from the published information storing function 12, and sends the information through the data transmitting/receiving function, the communication network 2 and the published information access-log recording server 20A to the information terminal 30.

In the published information access-log recording server (viewing-access-log recording server) 20A, the data transmitting/receiving function 21 transmits information to the information providing server 10 or the information terminal 30, and receives information from the information providing server 10 or the information terminal 30 over the communication network 2.

The data trapping function (viewing-access-log obtaining function) 22 obtains published information viewed on the information terminal 30 over the communication network 2 and an access-log of the information terminal 30 including a date/time of the access to the published information as a viewing-access-log (published information access-log, viewing access record evidence data group).

Namely, when the information terminal 30 has a viewing access to the information providing server 10, the data trapping function 22 traps the above various data as a viewing-access-log from a data group (data group transmitted via or passing through the published information access-log recording server 20A) exchanged between the information terminal 30 and the information providing server 10 over the communication network 2.

Here, the data trapping function 22 obtains both published information viewed and an access-log of the information terminal 30. Alternatively, the data trapping function 22 may be separated into different functions of separately obtaining the published information and the access-log (for example, a viewing data trapping function and an access-log function).

FIG. 2 is a block diagram for illustrating an example of access-log obtained and stored according to this embodiment. As shown in FIG. 2, the access-log includes domain information, remote host information, browser name information and reference directory information along with an access date and an access time. The access-log is not limited to the above example. Terminal information relating to the information terminal (access source) 30 that has accessed to the published information such as a communication network address, a name, an access route and the like on a viewer's (information terminal 30) side may be obtained as the access-log.

The data storing function (viewing-access-log storing function) 23 makes a pair of published information data and an access-log trapped by the data trapping function 22, and stores the pair as a viewing-access-log (published information access-log, viewing access record evidence data group).

The information terminal 30 is used to retrieve and view published information in the information providing server 10 as described above. The information terminal 30 is, for example, a personal computer or an information terminal equipment such as a portable telephone or the like, which comprises a data transmitting/receiving function 31 and a WWW browser 32.

The data transmitting/receiving function 31 transmits information to the published information access-log recording server 20A, and receives information from the published information access-log recording server 20A over the communication network 2. The WWW browser (internet browser software) 32 is used when a viewing access or the like is had to the information providing server 10 over the communication network 2, that is, the WWW.

The information providing server 10 is configured with a computer such as a personal computer or the like. The data transmitting/receiving function 11, the published information storing function 12 and the published information bulletin function 13 described above are accomplished by hardware or software on the computer.

Similarly, the published information access-log recording server 20A is configured with a computer such as a personal computer or the like. The data transmitting/receiving function 21, the data trapping function 22 and the data storing function 23 described above are accomplished by hardware or software on the computer.

Figure 3:
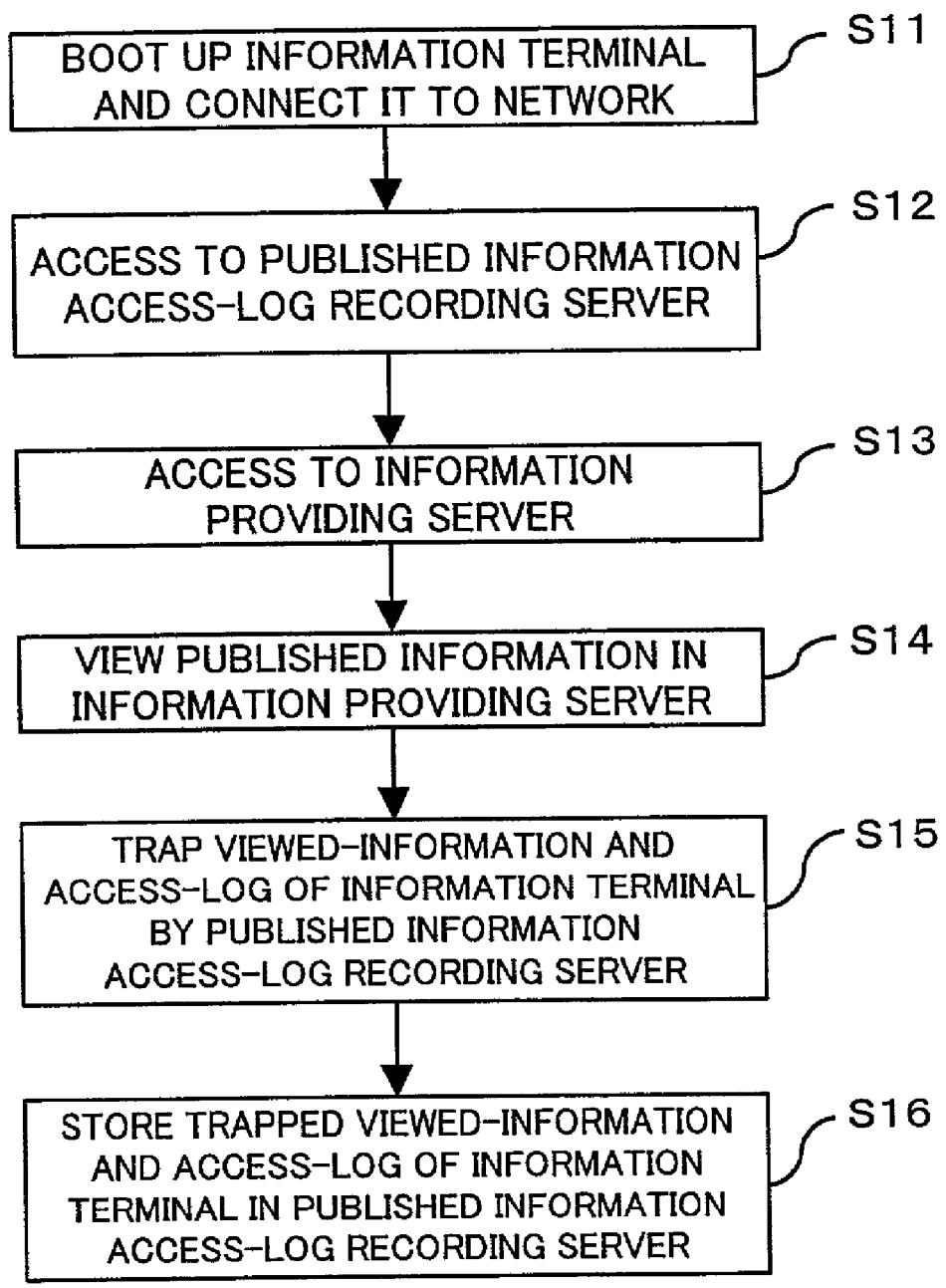
FIG. 3 is a flowchart for illustrating an operation according to the first embodiment.

Next, operations of the publication certifying system 1A and the published information access-log recording server 20A in the above structures according to the first embodiment will be described with reference to a flowchart (steps S11 to S16) shown in FIG. 3.

A person (a viewer, a third party) who desires to view published information in the information providing server 10 boots up the information terminal 30 (WWW browser 32), connects it to the communication network 2, and has a viewing access to the information providing server 10 over the communication network 2 (step S11).

The information terminal 30 first accesses to the published information access-log recording server 20A (step S12), then accesses to the information providing server 10 (step S13), whereby the information terminal 30 gets into a state in which the information terminal 30 can view the published information in the information providing server 10.

In the information providing server 10, published information that the viewer desires is retrieved in and read out from the published information storing function 12 by the published information bulletin function 13 according to an instruction from the information terminal 30, and sent back to the information terminal 30 via the published information access-log recording server 20A to be provided to the viewer (step S14).

When the published information passes through the published information access-log recording server 20A, the published information viewed by the viewer (the third party) and an access-log of the information terminal 30 including an access date/time to the published information are trapped as a viewing-access-log by the data trapping function (step S15), and stored by the data storing function 23 (step S16) in the published information access-log recording server 20A.

In the publication certifying system 1A, when the information terminal 30 on the viewer's side has an access to published information in the information providing server 10, the information terminal 30 accesses via the published information access-log recording server 20A, as described above. In the published information access-log recording server 20A, contents data of the published information accessed and viewed by the information terminal 30 and the access-log including an access date/time, etc. are stored as a viewing-access-log in the published information access-log recording server 20A. As the access-log, not only an access date/time but also terminal information such as a communication network address, a name, an access route and the like on the viewer's side is trapped and stored. The viewed published information data viewed on the information terminal 30 (viewed-information) and the access-log are made a pair and stored as above, it is thereby possible to leave evidence that the above published information data has been accessible as published information.

In the publication certifying system 1A and the published information access-log recording server 20A according to the first embodiment of this invention, contents and a viewing date/time of published information viewed by a viewer that is a third party can be recorded as a viewing-access-log, and publication history of the published information can be stored in a provable form by the viewing-access-log. It is therefore possible to prove that the published information has been in a state in which everyone can access to the published information on the communication network at least at that viewing date/time, that is, to prove that the electronic data has been notified and published on the communication network 2. Therefore, it is possible to give admissibility similar to that of a printed matter or a published matter to information published on the communication network 2 by the information providing server 10.

By using the publication certifying system 1A and the published information access-log recording server 20A according to the first embodiment of this invention, it is possible to provide services of not only electronic notary but also disclosure records of information disclosure and proof of being accessible. This provides a good possibility of creation of new business.

Further, terminal information (communication network address, name, access route and the like) relating to the information terminal 30 having accessed to the published information is obtained as a viewing-access-log. On the basis of the terminal information included in the viewing-access-log, it is possible to specify on which route the information terminal 30 has had a viewing access to the published information, which can increase admissibility of the viewing-access-log.

Still further, with use of the publication certifying system 1A according to this embodiment, a service of certifying a date/time at which electronic data has been published in a state in which the electronic data can be viewed by a third party on the communication network 2 becomes possible. This in turn allows the electronic data to be used as evidence in various aspects.

For instance, in the view of PL (Product Liability) Law, the company can certify a term during which problem information or call-back information of a product has been published on the Web (communication network) and thus viewable, thereby certifying that the company makes an effort to perform the liability for notification.

Conversely, by using this service, the consumer can record and store with a third party digital signature a fact that the company has published a specific page, thereby leaving evidence of an extravagant advertisement or a breach of contact. Namely, not the managing side of the information providing server 10 uses this service, but users who access to the information use this service. When a slanderous or libelous document is published on the open bulletin board on the Web (communication network 2), it is possible to certainly leave evidence of a defamation with use of the publication certifying system 1A.

In the above first embodiment, the information providing server 10 and the published information access-log recording server 20A are separately described for the sake of convenience. However, both a function as the information providing server 10 and a function as the published information access-log recording server 20A may be physically incorporated in one server machine. The server here signifies a server as a function. Use of one server as both the information providing server 10 and the published information access-log recording server 20A can eliminate necessity for separately providing two kinds of servers, thus can configure the publication certifying system 1A more simply.

A function as the published information access-log recording server 20A may be incorporated in a proxy server of the Internet service provider. In such case, only by changing a proxy server designated by a WWW browser (Internet browser software) 32 generally used in the information terminal 30 to a proxy server having a function as the published information access-log recording server 20A, it is possible to readily use the publication certifying system 1A. It is also possible for the Internet provider to readily provide a new service.

Still further, the data storing function 23 of the published information access-log recording server 20A may store published information included in a viewing-access-log in a compressed form. In consideration of a storage capacity of a hard disk or the like, it is more desirable that published information data, which is viewed on the information terminal 30 and stored along with the access-log, is stored in a compressed form than as it is. By compressing the data as this, it is possible to efficiently use a storage area of a hard disk or the like for actually storing the viewing-access-log.

[2] Description of Second Embodiment

Figure 4:
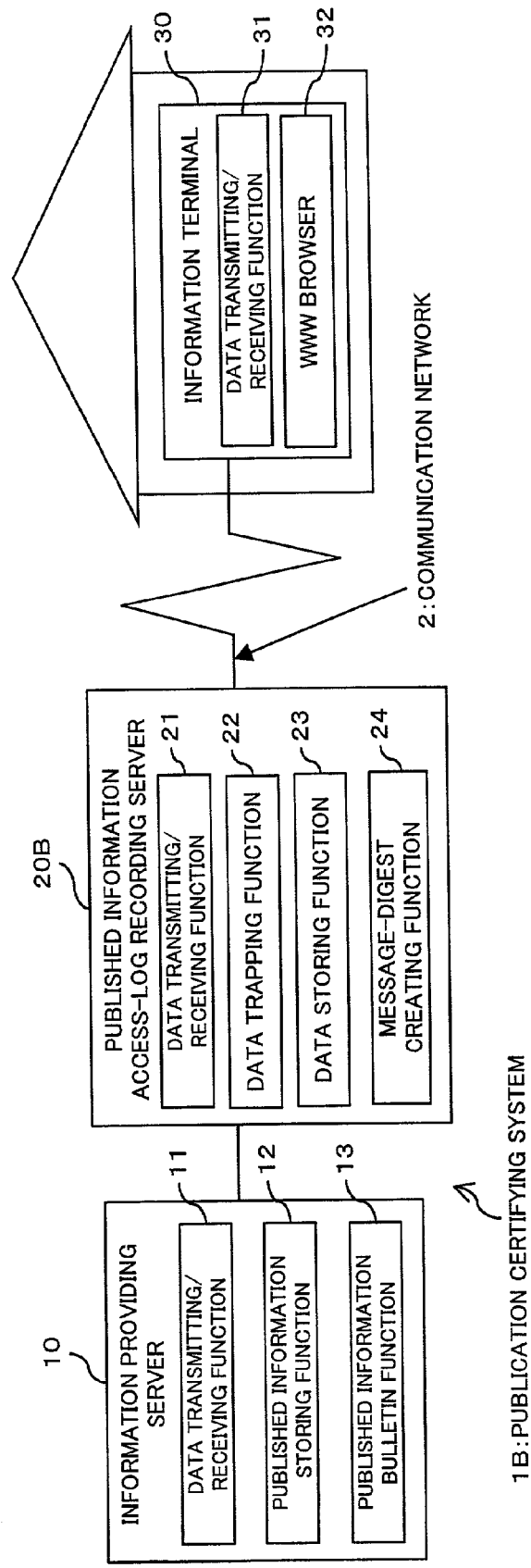
FIG. 4 is a block diagram showing a structure of a publication certifying system according to a second embodiment of this invention.

FIG. 4 is a block diagram showing a structure of a publication certifying system according to a second embodiment of this invention. In FIG. 2, like reference characters designate like or corresponding parts described above, detailed descriptions of which are thus omitted.

As shown in FIG. 4, the publication certifying system 1B according to the second embodiment is similarly configured to the publication certifying system 1A according to the first embodiment. However, the publication certifying system 1B has a published information access-log recording server (viewing-access-log recording server) 20B instead of the published information access-log recording server 20A according to the first embodiment. The published information access-log recording server 20B comprises a message-digest creating function 24 along with a data transmitting/receiving function 21, a data trapping function 22 and a data storing function 23 similar to those according to the first embodiment.

The message-digest creating function 24 creates a message digest of published information trapped by the data trapping function 22. The data storing function 24 according to the second embodiment stores, instead of the original of published information, a message digest created from contents data of the published information (viewed-information) by the message-digest creating function 24.

Algorithm such as MD5 (Message Digest algorithm 5) or the like is used to create a message digest. Alternatively, message digests of all viewing-access-logs may be created by the message-digest creating function 24, and stored in the data storing function 23. Namely, a message digest of an access-log of the information terminal 30 may be also created, and the message digest created from the access-log by the message-digest creating function 24 may be stored, instead of the original of an access-log of the information terminal 30, in the data storing function 23 according to the second embodiment.

The published information access-log recording server 20B is configured with a computer such as a personal computer or the like, similarly to the published information access-log recording server 20A according to the first embodiment. The data transmitting/receiving function 21, the data trapping function 22, the data storing function 23 and the message-digest creating function 24 are accomplished by hardware or software on the computer.

Figure 5:
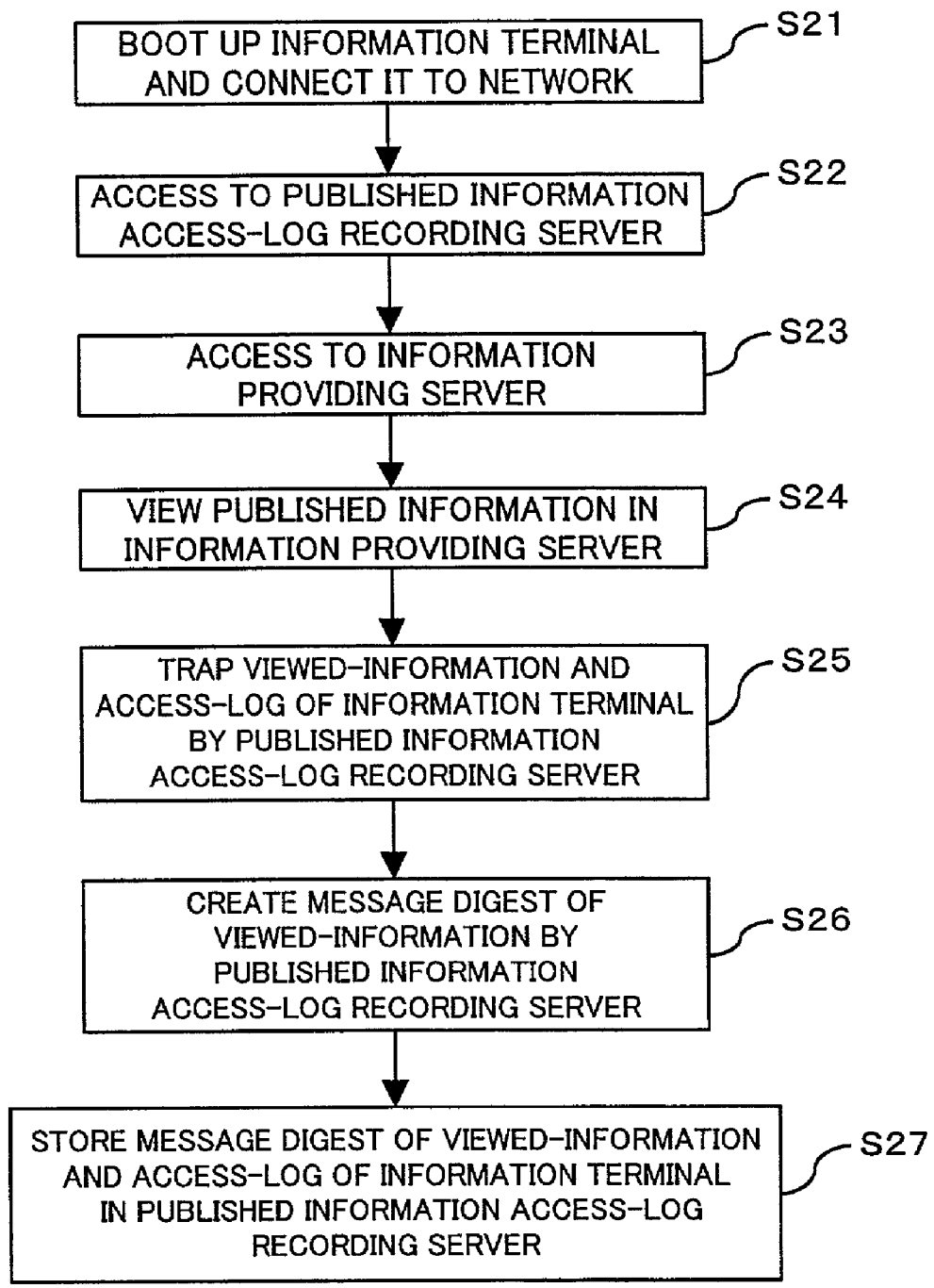
FIG. 5 is a flowchart for illustrating an operation according the second embodiment.

Next, operations of the publication certifying system 1B and the published information access-log recording server 20B in the above structures according to the second embodiment will be described with reference to a flowchart (steps S21 to S27) shown in FIG. 5.

A person (a viewer, a third party) who desires to view published information in the information server 10 boots up the information terminal 30 (WWW browser 32) to connect it to the communication network 2, and has a viewing access to the information providing server 10 over the communication network (step S21) similarly to the first embodiment.

The information terminal 30 first accesses to the published information access-log recording server 20B (step S22), accesses to the information providing server 10 (step S23), then gets into a state in which the information terminal 30 can view the published information in the information providing server 10.

In the information providing server 10, the published information that the viewer desires is retrieved in and read out from the published information storing function 12 by the published information bulletin function 13 according to an instruction from the information terminal 30, and sent to the information terminal 30 via the published information access-log recording server 20B to be provided to the viewer (step S24).

When the published information passes through the published information access-log recording server 20B, the published information viewed by the viewer (the third party) and an access-log of the information terminal 30 including a date/time of the access to the published information are trapped as a viewing-access-log by the data trapping function 22 in the published information access-log recording server 20B (Step S25).

According to the second embodiment, a message digest of the published information data trapped by the data trapping function 22 is created by the message-digest creating function 24 (step S26). A pair of the message digest and the access-log of the information terminal 30 are stored by the data storing function 23 (step S27).

In the publication certifying system 1B, the information terminal 30 on the viewer's side accesses to published information via the published information access-log recording server 20B when accessing to the published information in the information providing server 10, similarly to the publication certifying system 1A according to the first embodiment. In the published information access-log recording server 20B, a message digest created from contents data of the published information accessed and viewed by the information terminal 30 and an access-log including an access date/time are stored as a viewing-access-log.

In this case, it is necessary to store published information laid open and notified by the information providing server 10 in the published information storing function 12 even after the publication of the published information ends. A reason of this is that when a message digest of the published information is used as evidence of the publication, it is necessary to create a message digest using the same algorithm as that used by the message-digest creating function 24 from the published information stored by the published information storing function 12, and compare the created message digest with a message digest included in the viewing-access-log to confirm whether quite the same message-digest is created or not.

Alternatively, an access-log of the information terminal 30 may be stored not in the published information access-log recording server 20 but in the information providing server 10, and only a message digest included in the viewing-access-log may be stored in the published information access-log recording server 20B.

When the published information access-log recording server 20B manages viewing records of published information in a plurality of information providing servers 10, for example, it is more realistic that published information is stored in a form of a message digest of contents data of the published information than that the original of the published information is stored, when considering a capacity of the record medium.

An access-log in a small quantity of data of the information terminal 30 is stored as it is in the published information access-log recording server 20B. Whereby, it becomes unnecessary to coincide a record format in the information server 10 for the access-log of the information terminal 30 with a record format in the published information access-log recording server 20B for the same.

Accordingly, it is a practical way that only contents data of published information data is digested and stored, whereas an access-log of the information terminal 30 is stored as it is.

As above, it is possible to leave evidence that the published information data has been accessible as published information by making a pair of a message digest of the published information data viewed on the information terminal 30 and a viewing-access-log (viewing access record evidence data group) and storing them.

The publication certifying system 1B and the published information access-log recording server 20B according to the second embodiment provide the similar functions and effects to the first embodiment. It is further possible to efficiently use a storage area of a hard disk or the like for actually storing a viewing-access-log by storing published information data in a form of message digest.

[3] Description of Third Embodiment

Figure 6:
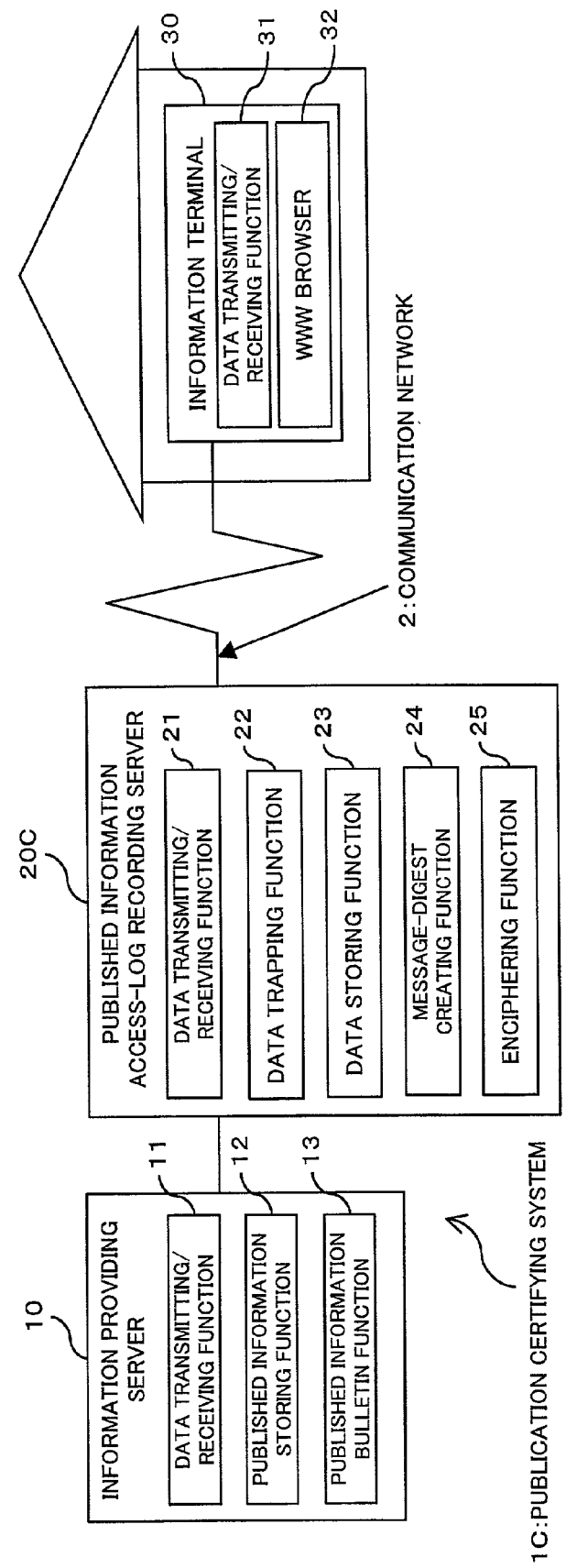
FIG. 6 is a block diagram showing a structure of a publication certifying system according to a third embodiment of this invention.

FIG. 6 is a block diagram showing a structure of a publication certifying system according to a third embodiment of this invention. In FIG. 6, like reference characters designates like or corresponding parts described above, detailed descriptions of which are thus omitted.

As shown in FIG. 6, the publication certifying system 1C according to the third embodiment is configured almost similarly to the publication certifying system 1B according to the second embodiment. However, the publication certifying system 1C according to the third embodiment has a published information access-log recording server (viewing-access-log recording server) 20C instead of the published information access-log recording server 20B according to the second embodiment. The published information access-log recording server 20C comprises an enciphering function 25 along with a data transmitting/receiving function 21, a data trapping function 22, a data storing function 23 and a message-digest creating function 24 similar to those according to the second embodiment.

The enciphering function 25 enciphers a viewing-access-log to be stored by the data storing function of the published information access-log recording server 20C with a secret key of the published information access-log recording server 20C to put a digital signature to the viewing-access-log.

Namely, the enciphering function 25 puts a digital signature to published information data viewed on the information terminal 30 or a message digest thereof, and an access-log of the information terminal 30 having had a viewing access to the published information or a message digest thereof to be stored as a viewing-access-log by the data storing function 23 of the published information access-log recording server 20C, using a secret key of the published information access-log recording server 20C. Note that the enciphering function 25 according to the third embodiment puts a digital signature to a viewing-access-log including a message digest of published information data and an access-log of the information terminal 30, using a secret key of the published information access-log recording server 20C.

The published information access-log recording server 20C is configured with a computer such as a personal computer or the like similarly to the published information access-log recording server 20A according to the first embodiment. The data transmitting/receiving function 21, the data trapping function 22, the data storing function 23, the message-digest creating function 24 and the enciphering function 25 are accomplished by hardware or software on the computer.

Figure 7:
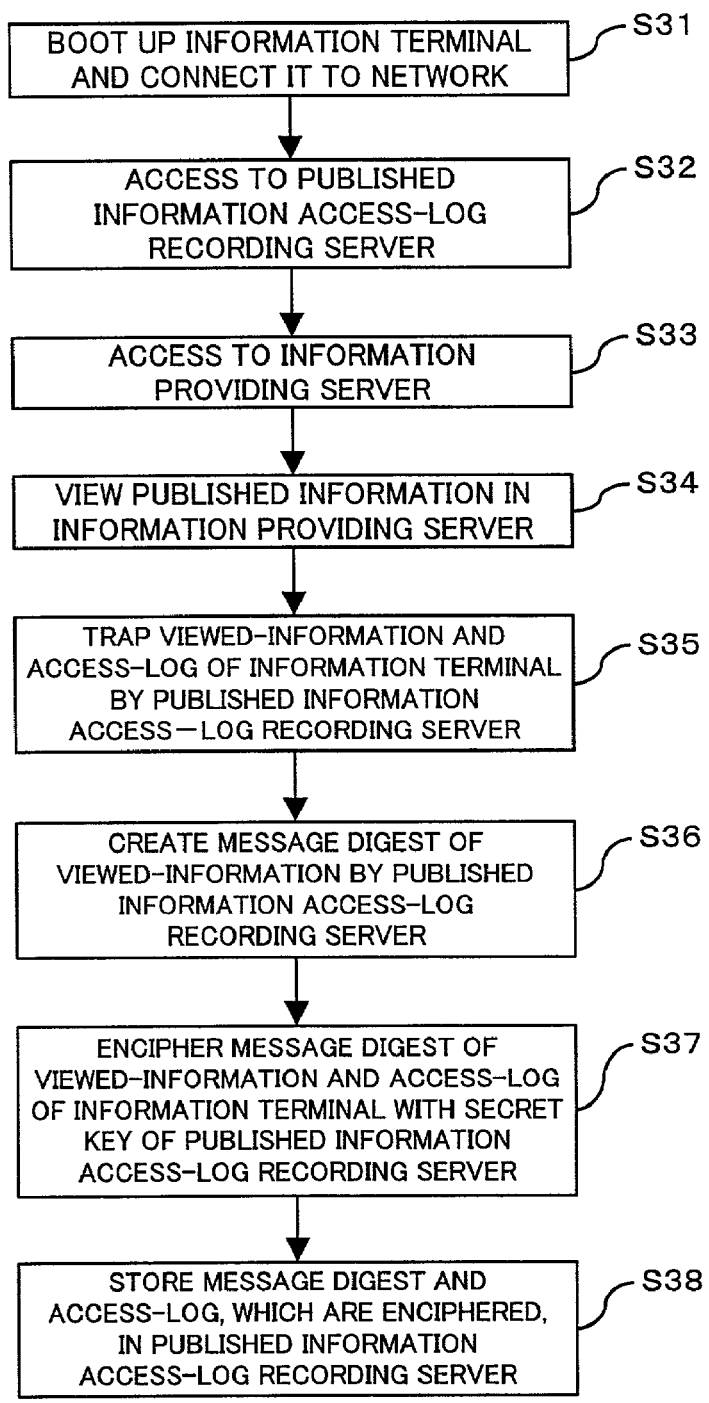
FIG. 7 is a flowchart for illustrating an operation according to the third embodiment.

Next, operations of the publication certifying system 1C and the published information access-log recording server 20C in the above structure according to the third embodiment will be described with reference to a flowchart (steps S31 to S38) shown in FIG. 7.

A person (a viewer, a third party) who desires to view published information in the information providing server 10 boots up the information terminal 30 (WWW browser 32) to connect it to the communication network 2, and has a viewing access to the information providing server 10 over the communication network 2 (step S31), similarly to the second embodiment.

The information terminal 30 first accesses to the published information access-log recording server 20C (step S32), accesses to the information providing server 10 (step S33), then gets into a state in which the information terminal 30 can view the published information in the information providing server 10.

In the information providing server 10, published information that the viewer desires is retrieved in and read out from the published information storing function 12 by the published information bulletin function 13 according to an instruction from the information terminal 30, sent to the information terminal 30 via the published information access-log recording server 20C to be provided to the viewer (step S34).

When the published information passes through the published information access-log recording server 20C, the data trapping function 22 traps the published information viewed by the viewer (the third party) and an access-log of the information terminal 30 including an access date/time to the published information as a viewing-access-log (step S35), and the message-digest creating function 24 creates a message digest of the trapped published information (step S36) in the published information access-log recording server 20C.

According to the third embodiment, the enciphering function 25 enciphers a viewing-access-log including the message digest of the published information data and the access-log of the information terminal 30 using a secret key of the published information access-log recording server 20C to put a digital signature thereto (step S37). Then, the data storing function 23 stores the viewing-access-log put the digital signature thereto (step S38).

In the publication certifying system 1C, the information terminal 30 on the viewer's side accesses to published information in the information server 10 via the published information access-log recording server 20C when accessing to the published information in the information providing server 10 as above, like the publication certifying system 1B according to the second embodiment. A viewing-access-log put a digital signature thereto is stored in the published information access-log recording server 20C.

According to the third embodiment of this invention, the publication certifying system 1C and the published information access-log recording server 20C provide similar functions and effects to the first and second embodiments. Additionally, it is possible to certainly prevent a viewing-access-log from being altered since the viewing-access-log is stored with a digital signature, which further increases admissibility of the viewing-access-log.

[4] Description of Fourth Embodiment

Figure 8:
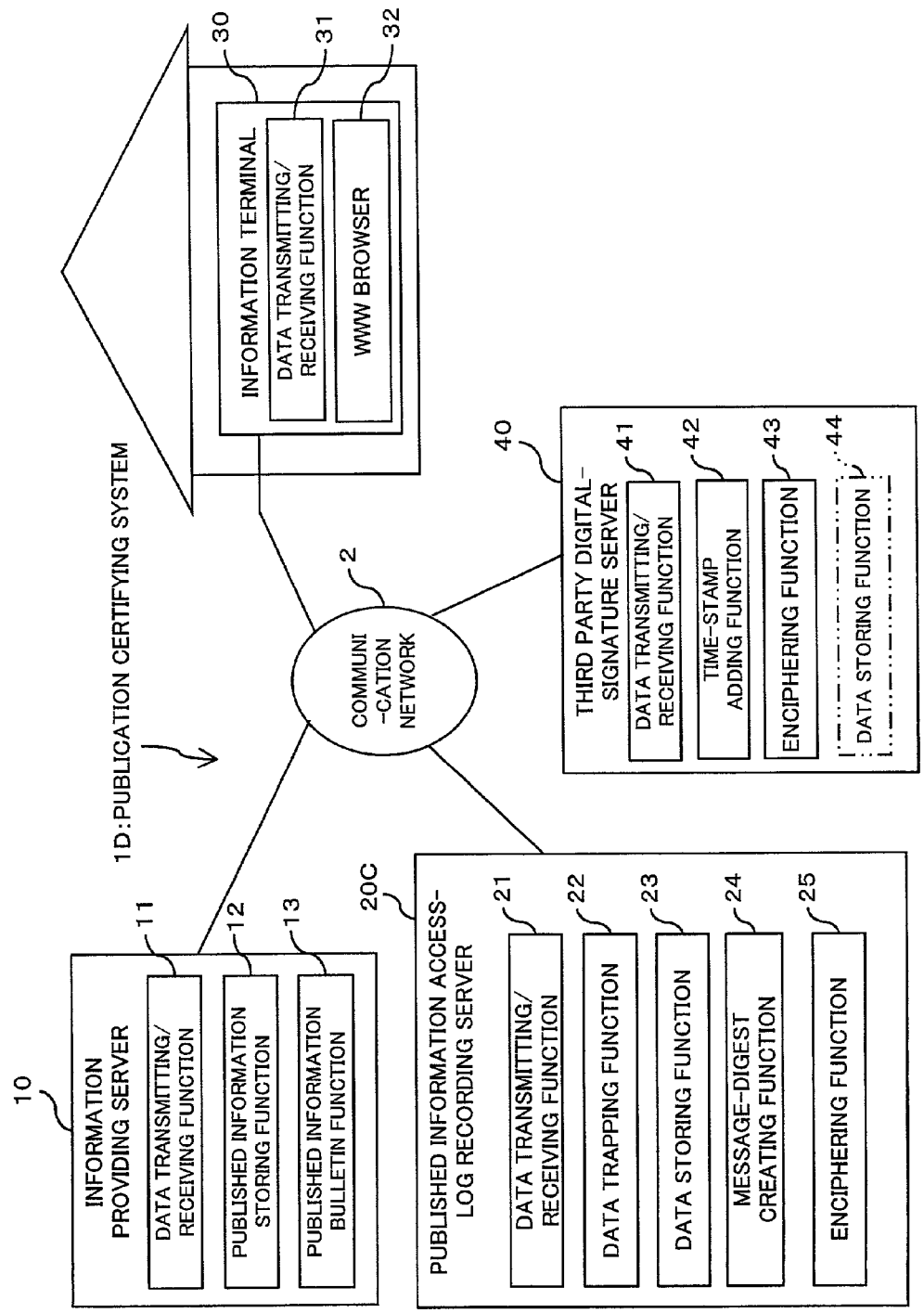
FIG. 8 is a block diagram showing a structure of a publication certifying system according to a fourth embodiment of this invention.

FIG. 8 is a block diagram showing a structure of a publication certifying system according to a fourth embodiment of this invention. In FIG. 8, like reference characters designate like or corresponding parts described above, detailed descriptions of which are thus omitted.

As shown in FIG. 8, the publication certifying system 1D according to the fourth embodiment is configured almost similarly to the publication certifying system 1C according to the third embodiment. However, the publication certifying system 1D according to the fourth embodiment further comprise a third party digital-signature server 40 along with an information providing server 10 and a published information access-log recording server 20C similar to those according to the third embodiment.

The third party digital-signature server 40 belongs to, for example, an electronic notary company. The third party digital-signature server 40 is communicably connected to the published information access-log recording server 20C over the communication network 2, which comprises a data transmitting/receiving function 41, a time-stamp adding function 42 and an enciphering function 43 to be described later in order to further put a digital signature to a viewing-access-log (viewing-access-log record evidence data group) to which a digital signal has been put by the published information access-log recording server 20C.

The data transmitting/receiving function 41 transmits information (for example, a viewing-access-log put a digital signature thereto and the like) to the published information access-log recording server 20C, and receives information (for example, a viewing-access-log to be put a digital signature thereto and the like) from the published information access-log recording server 20C.

When the time-stamp adding function 42 receives information (here, a viewing-access-log to which a digital signature has been put in the published information access-log recording server 20C) received by the data transmitting/receiving function 41, the time-stamp adding function 42 adds a time stamp (for example, a date and a time when the viewing-access-log is received) to the viewing-access-log.

The enciphering function 43 enciphers the viewing-access-log added the time stamp thereto with a secret key of the third party digital-signature server 40 to put a digital signature to the time-stamped viewing-access-log.

The time-stamped viewing-access-log put the digital signature thereto is sent back to the published information access-log recording server 20C over the communication network 2 by the data transmitting function 41, and stored by the data storing function 23.

The third party digital-signature server 40 may further comprise a data storing function (viewing-access-log storing function) 44 for storing the time-stamped viewing-access-log to which the digital signature has been put by the enciphering function 43. In such case, the time-stamped viewing-access-log to which the digital signature has been put may be sent back to the published information access-log recording server 20C and stored in the data storing function 23 as above, or stored in only the data storing function 44 of the third party digital-signature server 40.

Figure 9:
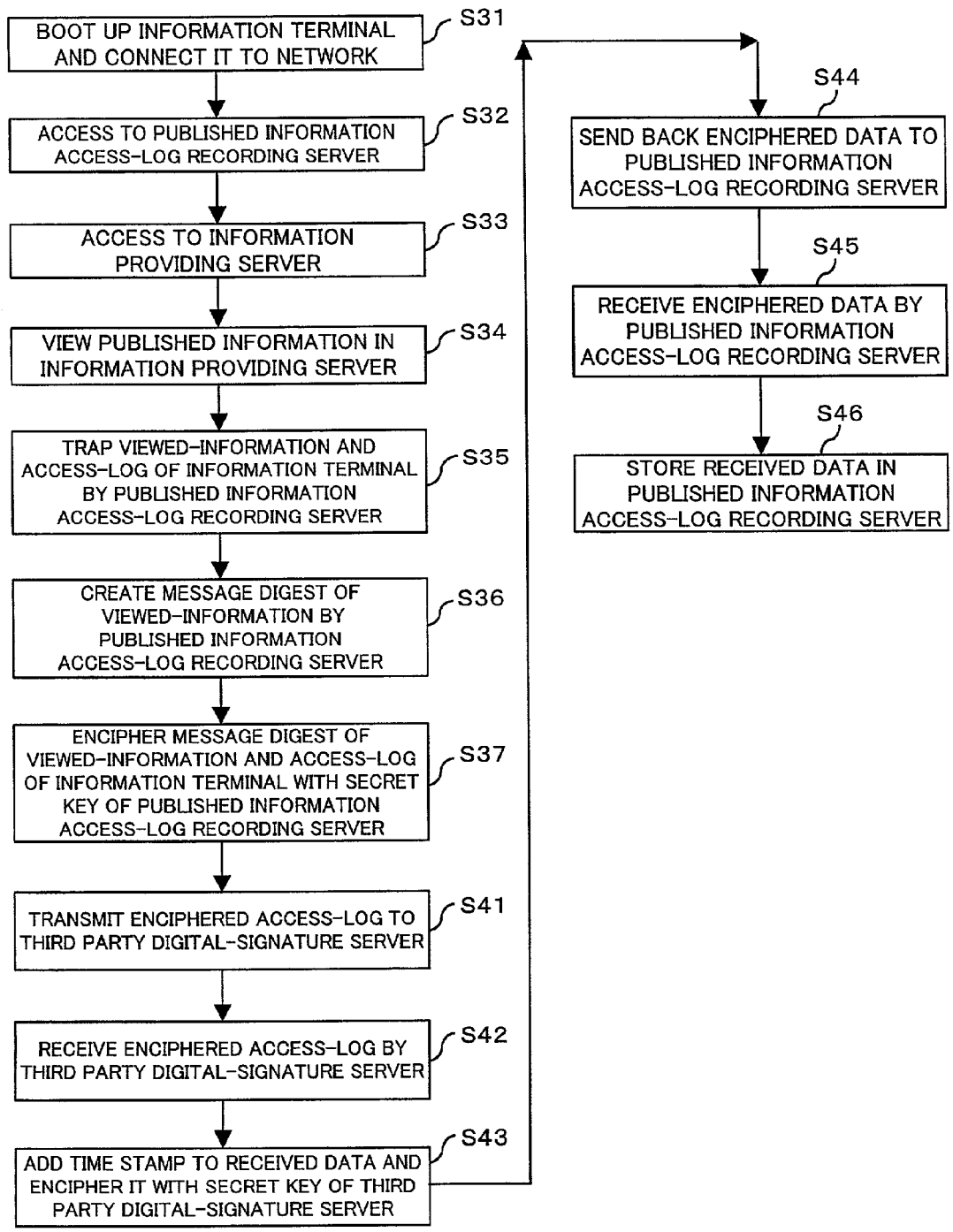
FIG. 9 is a flowchart for illustrating an operation according to the fourth embodiment.

Next, operations of the publication certifying system 1D and the third party digital-signature server 40 according to the fourth embodiment will be described with reference to a flow chart (steps S31 to S37, and S41 to S46) shown in FIG. 9. A process at steps S31 to S37 shown in FIG. 9 is similar to that shown in FIG. 9, description of which is thus omitted.

According to the fourth embodiment, a viewing-access-log (viewing access record evidence data group) to which a digital signature has been put by the enciphering function 25 of the published information access-log recording server 20C is transmitted to the third party digital-signature server 40 over the communication network 2 by the data transmitting/receiving function 21.

When the data transmitting/receiving function 41 of the third party digital-signature server 40 receives a viewing-access-log from the published information access-log recording server 20C (step S42) the time-stamp adding function 42 adds a time stamp to the received data, then the enciphering function 43 enciphers the time-stamped viewing-access-log with a secret key of the third party digital-signature server 40 to put a digital signature thereto (step S43)

After that, the data transmitting/receiving function 41 transmits the viewing-access-log to which the digital signature has been put (enciphered) at step S43 to the published information access-log recording server 20C over the communication network 2 (step S44)

When the data transmitting/receiving function 21 of the published information access-log recording server 20C receives the enciphered viewing-access-log from the third party digital-signature server 40 (step S45), the data storing function 23 stores the enciphered viewing-access-log (step S46).

According to the fourth embodiment, the publication certifying system 1D and the third party digital-signature server 40 provide similar functions and effects to the first to third embodiments. Additionally, since a time-stamped viewing-access-log obtained in the published information access-log recording server 20C, is further put a digital signature using a secret key of the third party digital-signature server 40, it is possible to certainly prevent the viewing-access-log from being altered. This can more increase admissibility of the viewing-access-log, that is, reliability of the viewing-access-log as evidence since a date/time (reception date/time) approximately corresponding to a viewing time is added as a time stamp.

The above fourth embodiment has been described by way of example where digital signatures are put to a viewing-access-log (viewing access record evidence data group) in both the published information access-log recording server 20C and the third party digital-signature server 40. However, a digital signature in the published information access-log recording server 20C may be omitted, whereas only a digital signature in the third party digital-signature server 40 may be carried out.

[5] Description of Fifth Embodiment

Figure 10:
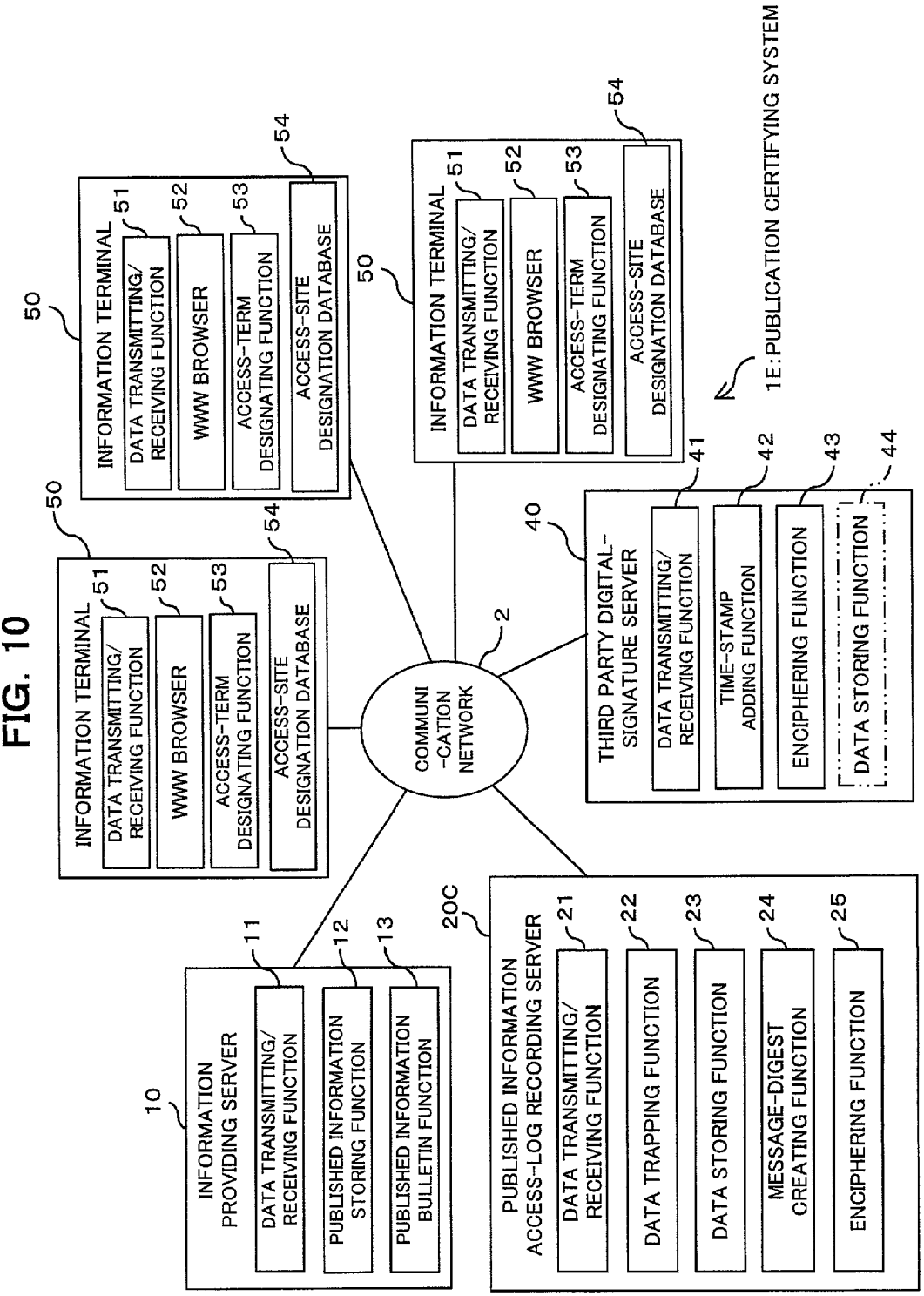
FIG. 10 is a block diagram showing a structure of a publication certifying system according to a fifth embodiment of this invention.

FIG. 10 is a block diagram showing a structure of a publication certifying system according to a fifth embodiment of this invention. In FIG. 10, like reference characters designate like or corresponding parts described above, detailed descriptions of which are thus omitted.

As shown in FIG. 10, the publication certifying system 1E according to the fifth embodiment is configured almost similarly to the publication certifying system 1D according to the fourth embodiment. However, the publication certifying system 1E according to the fifth embodiment further comprises a plurality (three in FIG. 10) of information terminals 50 for access-to-view along with an information providing server 10, a published information access-log recording server 20C and a third party digital-signature server 40 similar to those according to the fourth embodiment.

The purpose of each of the information terminals 50 is to intentionally leave a viewing-access-log (viewing access record evidence data group) to published information in the published information access-log recording server 20C. For this purpose, each of the information terminals 50 has periodically (at predetermined intervals) an access of viewing the published information in the information providing server 10. Each of the information terminals 50 is, for example, an information terminal equipment such as a personal computer or the like, comprising a data transmitting/receiving function 51, a WWW browser 52, an access-term designating function 53 and an access-site designation database 54 to be described later. These information terminals 50 are assumed to be located in plural different countries, respectively, for example.

The data transmitting/receiving function 51 transmits information to the published information access-log recording server 20A, and receives information from the published information access-log recording server 20A over the communication network 2.

The WWW browser (Internet browser software) 52 is used when a viewing access or the like is had to the information providing server 10 over the communication network 2, that is, the WWW.

The access-term designating function 53 designates an access date (term, time interval) at which the information terminal 50 should access to published information in the information providing server 10. The access-site designation database 54 beforehand holds an address of an access site (that is, the information providing server 10) designated in order that the information terminal 50 has a viewing access.

The WWW browser 52 of the information terminal 50 automatically has a viewing access to published information in the information providing server 10 beforehand registered in the access-site designation database 54 at each predetermined time in a predetermined term according to an access term designated by the access-term designating function 53.

Next, operations of the publication certifying system 1E and the information terminal 50 for access-to-view in the above structures according to the fifth embodiment will be described with reference to a flowchart (steps S51 to S59) shown in FIG. 11.

When the information terminal 50 is booted up and connected to the communication network 2 (step S51) the information terminal 50 (WWW browser 52) refers an access term designated by the access-term designating function 53 (step S52), and refers the database 54 and reads out an address of the information providing server 10 beforehand designated (step S53) The information terminal 50 automatically has a viewing access to published information in the designated information providing server 10 at each predetermined time in a predetermined term according to the access term (steps S54 to S56).

Via the published information access-log recording server 20C (step S54), the information terminal 50 accesses to the information providing server 10 (step S55), and gets into a state in which the information terminal 50 can view published information in the information providing server 10, like the information terminal 30 described before.

In the information providing server 10, the published information bulletin function 13 retrieves and reads the published information from the published information storing function 12 responsive to an instruction from the information terminal 50, and sends back the published information to the information terminal 50 via the published information access-log recording server 20C (step S56).

With this, the published information access-log recording server 20C and the third party digital-signature server 40 carry out processes at step S35 to S37 and steps S41 to S46 shown in FIG. 9, whereby a viewing-access-log (viewing access record evidence data group) is stored in the published information access-log recording server 20C (step S57).

After that, when the information terminal 50 stores an access-log of the viewing access (step S58) the information terminal 50 is disconnected from the communication network 2, and stopped (step S59). A series of the viewing access process is then terminated.

In the publication certifying system 1E, the information providing server 10 or the published information access-log recording server 20C does not wait occurrence of a viewing access from the information terminal 30 (refer to FIG. 1) on the viewer's side. But the administrator of the publication certifying system 1E beforehand provides the information terminal 50 periodically accessing to published information in the information providing server 10 over the Internet in a predetermined term, and makes the information terminal 50 actively generate a viewing access to the published information.

Whereby, a viewing-access-log (viewing access record evidence data group) is actively left in the published information access-log recording server 20C. It becomes thus possible to leave evidence that the published information in the information providing server 10 has been viewable in a term beforehand designated as an access term.

By disposing the information terminal 50 abroad, it is possible to prove that an access from another country has been possible. Further, by disposing the information terminals 50 in all member nations of Paris Convention and recording that an information access has been possible, it is possible to claim that information disclosed in the information providing server 10 is information about a known example in terms of patent.

According to the fifth embodiment of this invention, the publication certifying system 1E and the information terminal 50 for access-to-view provide similar functions and effects to the first to fourth embodiments. Additionally, the information terminal 50 periodically has a viewing access to published information, whereby a viewing-access-log to the published information is periodically and automatically recorded and stored in the published information access-log recording server 20C.

Even when there is no viewing access to the published information from a third party (for example, the information terminal 30 described above), it is possible to certainly certify that the published information has been accessible as electronic data by anyone even from abroad over the communication network 2, that is, the electronic data has been notified and published on the communication network 2, at least in a viewing access term of the information terminal 50 if the term is beforehand determined.

Therefore, it is possible to give admissibility similar to that of a printed matter or a published matter to information notified and published on the communication network 2, more certainly.

Additionally, it becomes possible to certify not only a date that the electronic document has been created but also a time and period that the electronic document has been accessible as published information from the outside over the communication network 2.

[5-1] Description of First Modification of Fifth Embodiment

Figure 12:
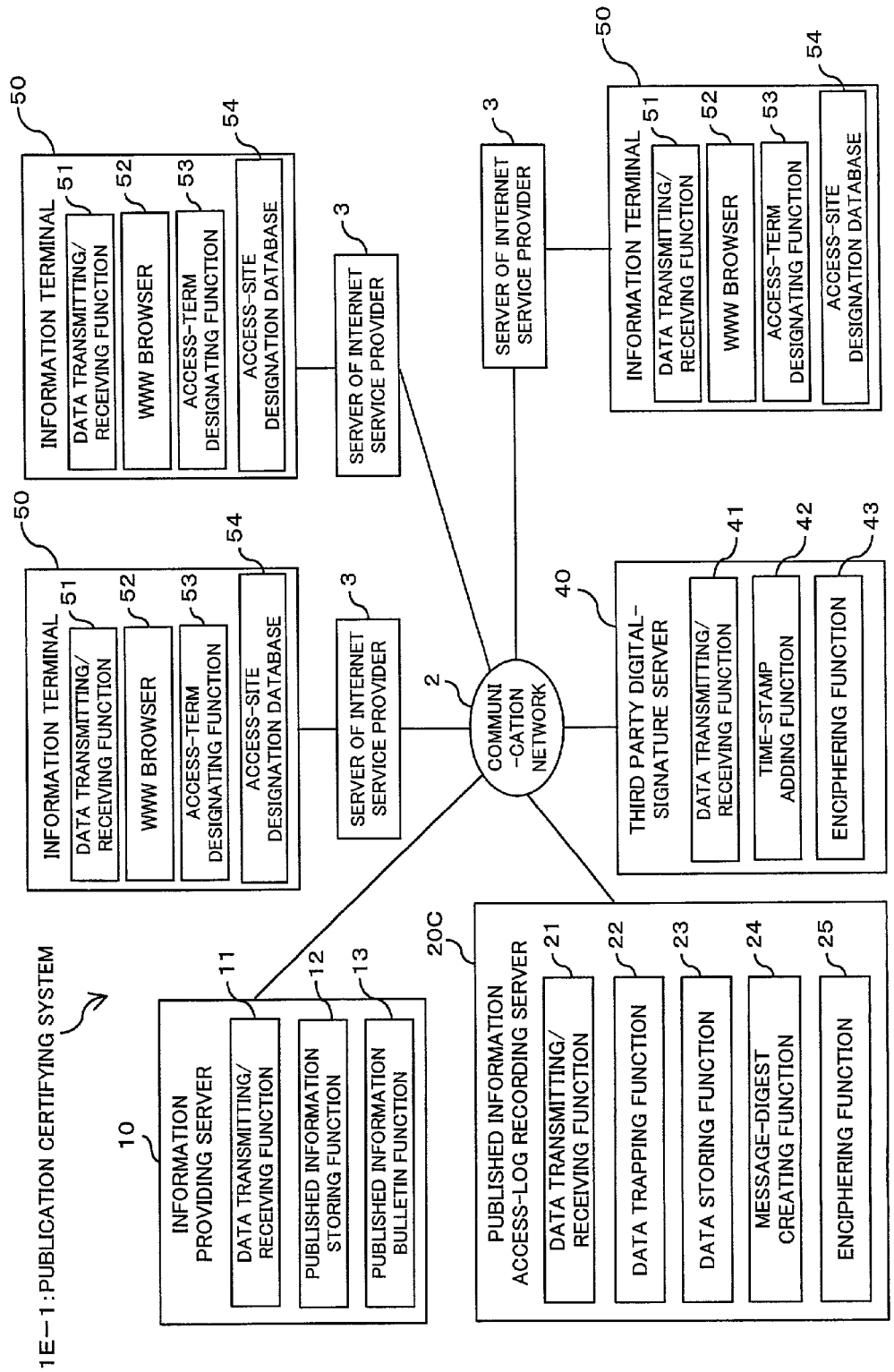
FIG. 12 is a block diagram showing a structure of a first modification of the publication certifying system according to the fifth embodiment of this invention.

FIG. 12 is a block diagram showing a structure of a first modification of the publication certifying system according to the fifth embodiment of this invention. In FIG. 12, like reference characters designate like or corresponding parts described above, detailed descriptions of which are thus omitted.

As shown in FIG. 12, the publication certifying system 1E-1 according to the first modification is configured similarly to the publication certifying system 1E according to the fifth embodiment. However, in the publication certifying system 1E-1 according to the first modification, a server 3 of an Internet service provider is interposed between the communication network 2 and each of plural information terminals 50 for access-to-view. Namely, each of the information terminals 50 is connected to the communication network 2 via the server 3 of the Internet service provider.

Next, an operation of the publication certifying system 1E-1 in the above structure according to the first modification of the fifth embodiment will be described with reference to a flowchart (steps S51 to S60) shown in FIG. 13. A process at steps S51 to S59 shown in FIG. 13 is almost similar to that shown in FIG. 11, detailed description of which is thus omitted.

According to the first modification of the fifth embodiment, when each of the information terminals 50 accesses to published information in the information providing server 10 via the published information access-log recording server 20C, the information terminal 50 is connected to the communication network 2 via the server 3 of the Internet service provider. For this, a new process at step S60 is carried out between step S53 and step S54 described before.

Figure 13:
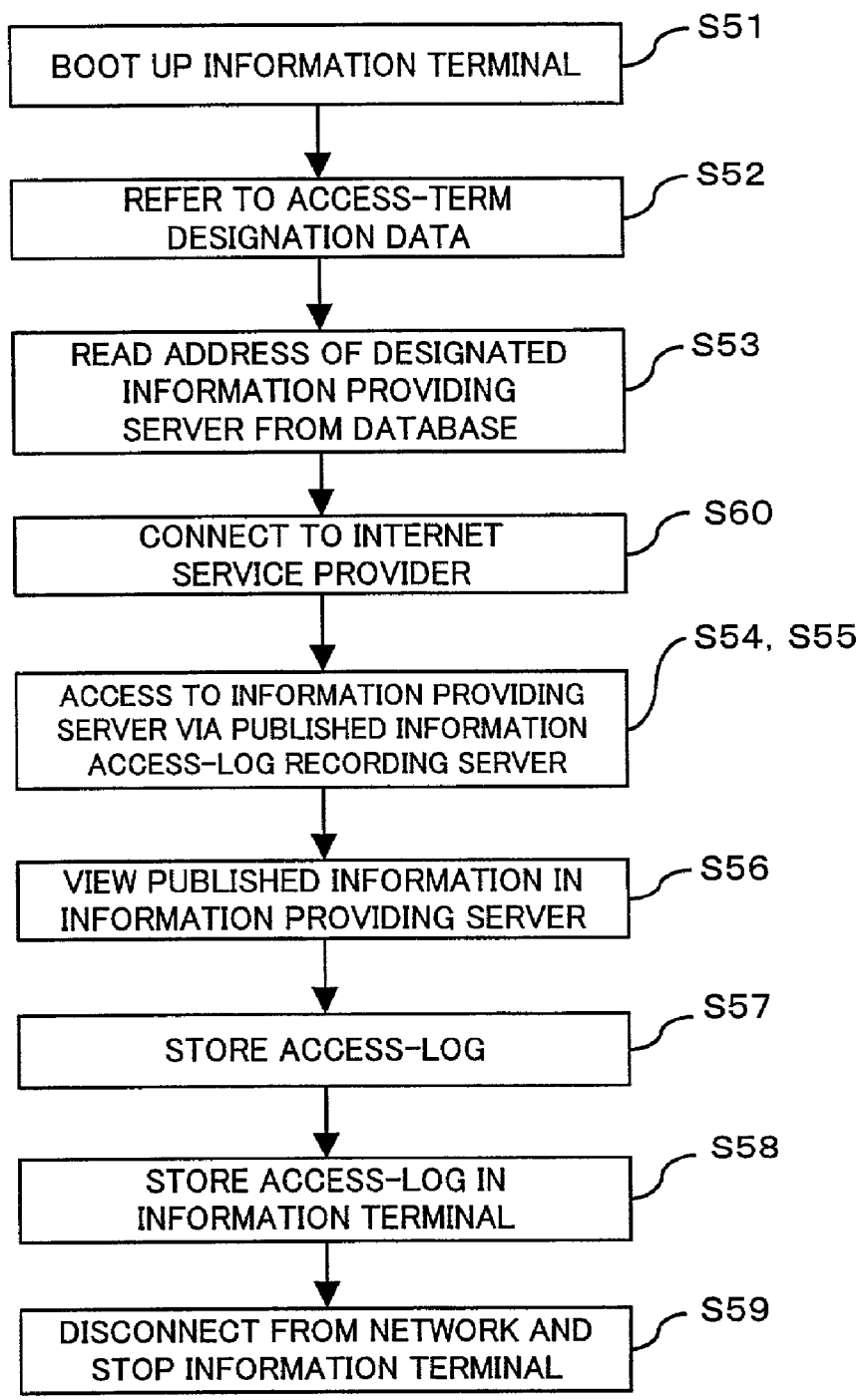
FIG. 13 is a flowchart for illustrating an operation of the first modification according to the fifth embodiment.

As shown in FIG. 13, after the process at step S53, the information terminal 50 is dial-up-connected to the server of the internet service provider 3 (step S60), and accesses to the information providing server 10 via the communication network 2 and the published information access-log recording server 20C through the server 3 (steps S54 and S55).

Figure 11:
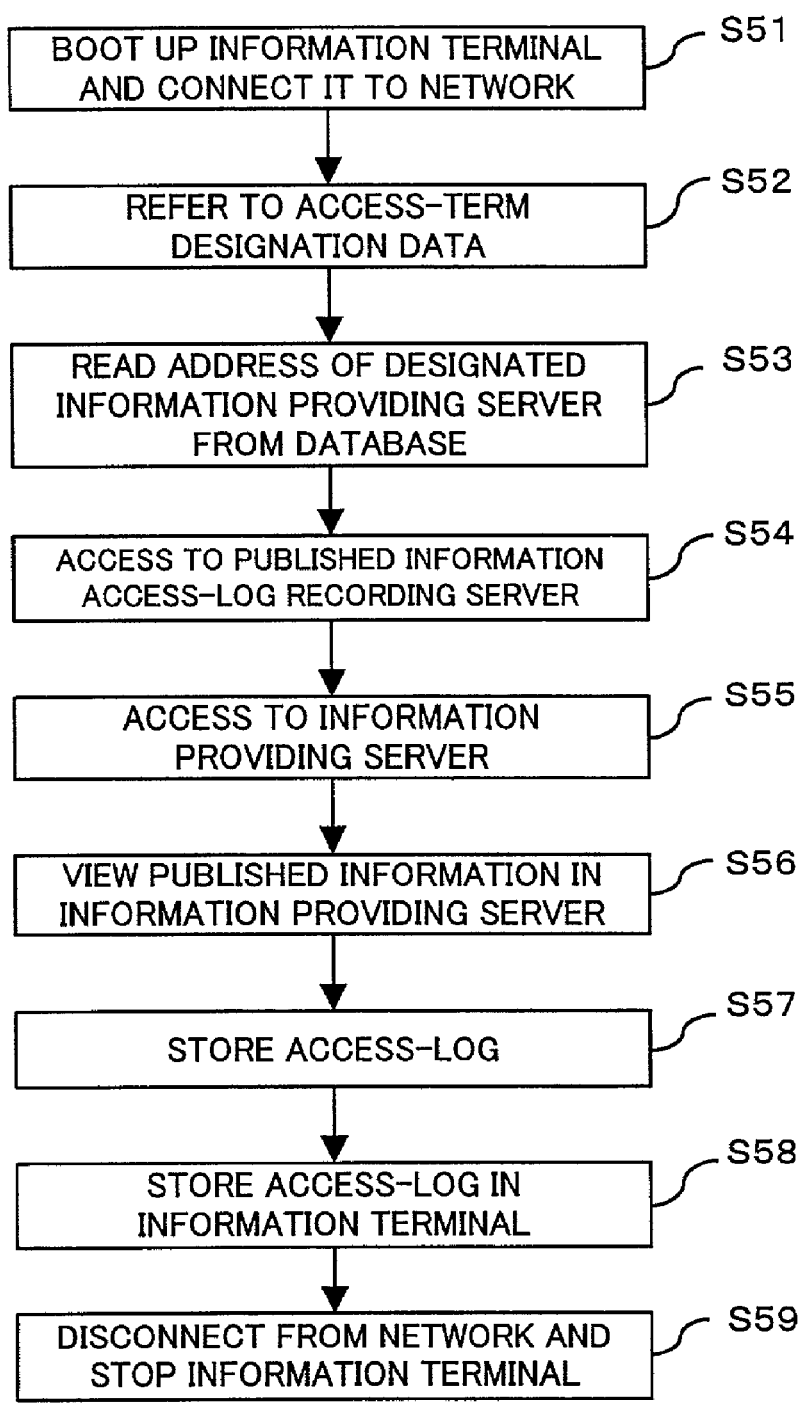
FIG. 11 is a flowchart for illustrating an operation according to the fifth embodiment.

At step S51 shown in FIG. 11, the information terminal 50 is booted up and connected to the communication network 2. According to the first modification, the information terminal 50 is only booted up at step S51 shown in FIG. 13 since the information terminal 50 is connected to the communication network 2 at steps S54 and S55, as described above.

As above, it is possible that an access can be had from each of plural providers in respective plural countries to a predetermined Web site (information providing server 10) via the predetermined information access-log recording server 20C.

A record that a viewing access has been had via the server 3 of the provider is left in the viewing-access-log (access-log of the information terminal 50) stored in the published information access-log recording server 20C, so that more reliable access information is left. Namely, it is possible to prove that published information has been accessible not from a specific IP (Internet Protocol) address or an access from a communication network domain but by dial-up connection via the server 3 of a major provider.

[5-2] Description of Second Modification of Fifth Embodiment

Figure 14:
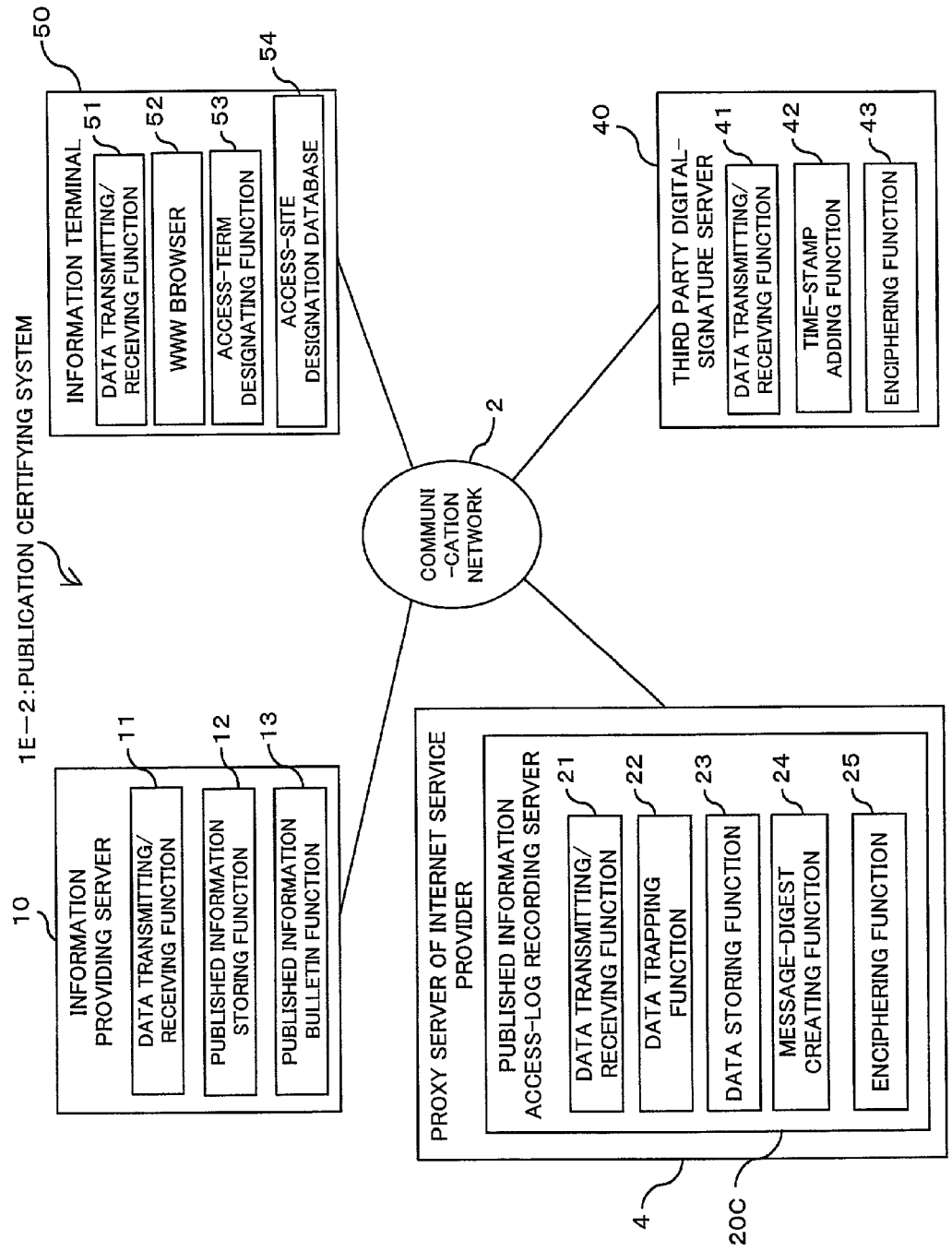
FIG. 14 is a block diagram showing a structure of a second modification of the publication certifying system according to the fifth embodiment of this invention.

FIG. 14 is a block diagram showing a structure of a second modification of the publication certifying system according to the fifth embodiment of this invention. In FIG. 6, like reference characters designate like or corresponding parts described above, detailed descriptions of which are thus omitted.

As shown in FIG. 14, the publication certifying system 1E-2 according to the second modification is configured almost similarly to the publication certifying system 1E according to the fifth embodiment. However, in the publication certifying system 1E-2 according to the second modification, a proxy server 4 of an Internet service provider has a function as the published information access-log recording server 20C.

In the publication certifying system 1E-2, a function as the viewing-access-log recording server 20C is incorporated in the proxy server 4 of the Internet service provider. Accordingly, only by changing the proxy server designated by the WWW browser (Internet browser software) 52 generally used in the information terminal 50 to the proxy server 4 having a function as the viewing-access-log recording server 20C, the information terminal 50 can readily use the publication certifying system 1E-2, besides the Internet service provider can readily provide a new service.

Further, by disposing an exclusive information terminal 50 in each nation, and automatically accessing from the information terminal 50 to the Web site (information providing server 10) via the above proxy server 4 at predetermined date or time, it is possible to automatically and certainly leave evidence in the proxy server 4 or the third party digital-signature server 40 that published information in the information providing server 10 has been perusable from each country.

[6] Description of Sixth Embodiment

According to a sixth embodiment, an inventive-technique publishing server 60 (refer to FIG. 15) is set as the information providing server 10, for example, as will be described later.

The inventive-technique publishing server 60 always publishes an inventive technique information of a contractant having made a contract with the server administrator. The contractant anonymously publishes inventive technique information as published information in the inventive-technique publishing server 60 instead of making a patent application when the contractant makes an invention in a region where acquisition of a patent right is vague.

When such information is notified, the administrator manages an access with, for example, a contractant's ID and a password. At this time, the administrator charges and collects an information notification fee per one case, for example.

The contractant gives up a right of the patent of his (her) own invention by publishing the technique in the inventive-technique publishing server 60, but can prevent other companies from applying the similar patent and acquiring the right. Since the technique is disclosed on a paper basis as general technical published information but on an electronic basis, the contractant can immediately disclose after inventing, thus can diminish possibility that the other applies the patent while the contractant prepares the disclosure as before.

In recent situation where fractionated patents are applied, a cost of patent applications increases in some company. In contrast, when the company does not make a patent application but holds it as still an idea, the company might not be able to use the technique if the other company makes the patent application.

For this, if a publishing term can be proved and the inventive-technique publishing server 60 can operate in a state in which anyone can access thereto, the inventor can avoid the worst situation. Why the information is anonymously disclosed is to prevent someone from investigating such a trend of technical development that who makes which invention.

Further, an access-log and data contents at the time that the contractant notifies inventive technique information in the inventive-technique publishing server 60 are stored as a publishing-access-log in the similar manner to the first to fifth embodiments. It is thereby possible to leave evidence that the inventive technique information has been notified. It is also possible to specify information about who notifies the inventive information from the contractant's ID.

Figure 15:
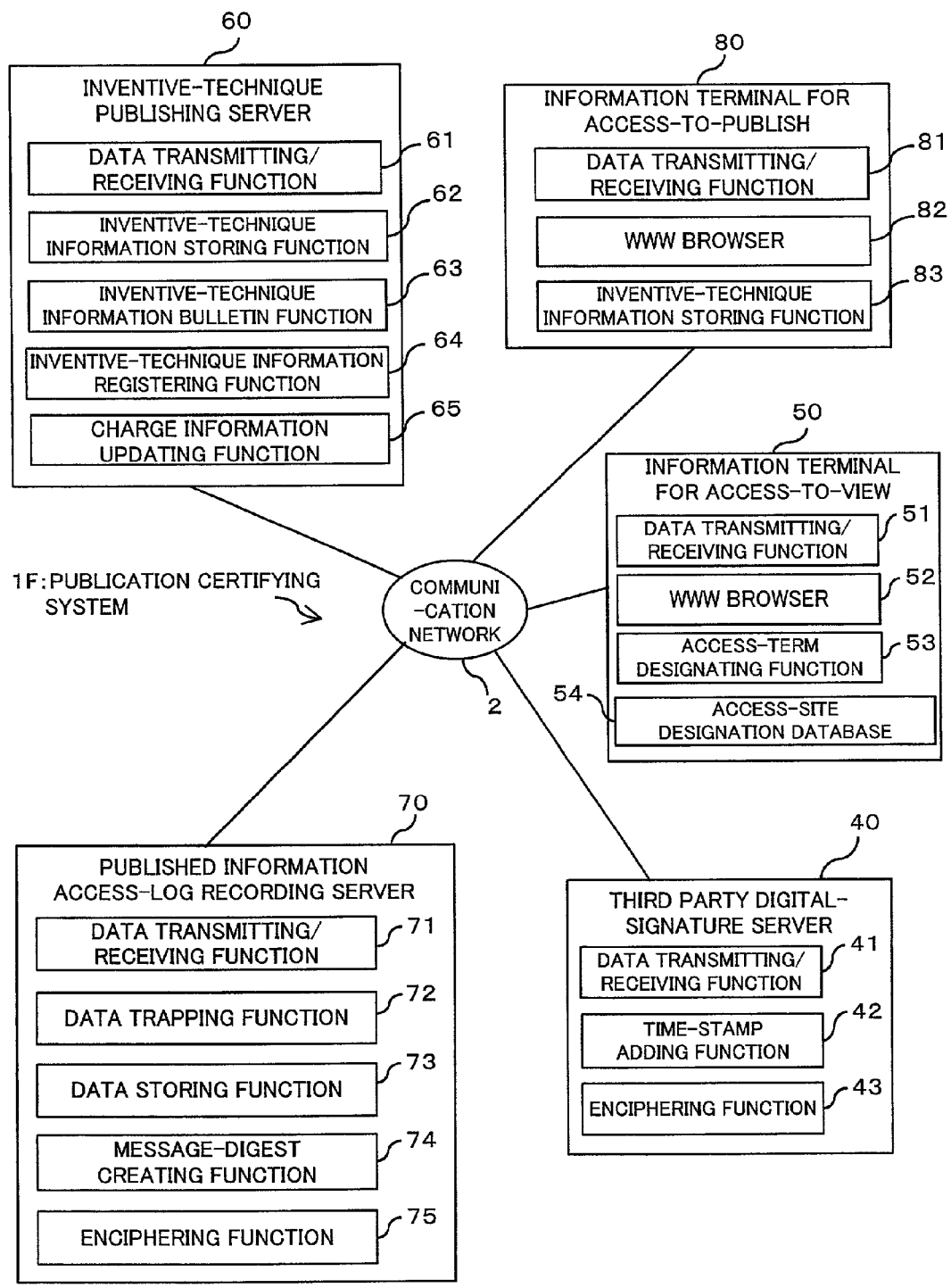
FIG. 15 is a block diagram showing a structure of a publication certifying system according to a sixth embodiment of this invention.

FIG. 15 is a block diagram showing a structure of a publication certifying system according to the sixth embodiment. In FIG. 15, like reference characters designate like or corresponding parts described above, detailed descriptions of which are thus omitted.

In the sixth embodiment, the structure according to this embodiment (publication certifying system) for certifying that information has been published information will be described by way of more concrete example, that is, a case where this invention is applied to a system for publishing inventive technique information to the public.

Accordingly, the publication certifying system 1F according to the sixth embodiment is configured similarly to the publication certifying system 1E according to the fifth embodiment. However, the publication certifying system 1F according to the sixth embodiment comprises an inventive-technique publishing server 60 instead of the information providing server 10 according to the fifth embodiment, and a published information access-log recording server 70 instead of the published information access-log recording server 20C according to the fifth embodiment.

The sixth embodiment further provides an information terminal 80 for access-to-publish used by a person who desires to publish information (here, inventive technique information) to transmit and publish the information to the inventive-technique publishing server 60. The information terminal 80 is an information terminal equipment of a personal computer or the like, which comprises a data transmitting/receiving function 81 similar to the information terminals 30 and 50 described above, a WWW browser (Internet browser software) 82, and an inventive-technique information storing function 83.

The administrator of the inventive-technique publishing server 60 makes a use contract with a person who desires to notify, thereby beforehand giving identification information (a user's ID, a contractant's ID) and a password (a pass phrase). When transmitting inventive technique information from the information terminal 80 to the inventive-technique publishing server 60 to notify it, the person who desires to publish the information transmits the identification information and the password from the information terminal 80 to the inventive-technique publishing server 60 over the communication network 2 in prior thereto.

The inventive-technique publishing server (information providing server) 60 comprises a data transmitting/receiving function 61, an inventive-technique information storing function 62, an inventive-technique information bulletin function 63, and inventive-technique information registering function 64 and a charge information updating function 65.

The data transmitting/receiving function 61, the inventive-technique information storing function 62 and the inventive-technique information bulletin function 63 correspond to the data transmitting/receiving function 21, the published information storing function 22 and the published information bulletin function 23 described above, respectively. Note that the inventive-technique information storing function 62 and the inventive-technique information bulletin function 63 handle more concrete inventive technique information as published information than that handled by the published information storing function 22 and the published information bulletin function 23.

The inventive-technique information registering function 64 confirms a person who desires to publish on the basis of identification information and a password transmitted from the person who desires to publish, after that, registers inventive technique information transmitted from the information terminal 80 in the inventive-technique storing function 62 to store and publish it.

When the inventive-technique information registering function 64 registers the inventive technique information, the charge information updating function 65 updates charge information about the person who desires to publish corresponding to the identification information in order to collect an information notification fee from the person who publishes the information (contractant).

The inventive-technique publishing server 60 described above is configured with a computer such as a personal computer or the like. The data transmitting/receiving function 61, the inventive-technique information storing function 62, the inventive-technique information bulletin function 63, the inventive-technique information registering function 64 and the charge information updating function 65 described above are accomplished by hardware or software on the computer.

The published information access-log recording server 70 comprises a data transmitting/receiving function 71, a data trapping function 72, a data storing function 73, a message-digest creating function 74 and an enciphering function 74 corresponding to the above-described functions 21 to 25, respectively.

The published information access-log recording server 70 according to the sixth embodiment has a function as a publishing-access-log recording server for obtaining and storing a publishing-access-log including data contents and a publishing date/time of inventive technique information when the information terminal 80 has a publishing access for the inventive technique information, along with the similar function as the published information access-log recording server 20C described above, that is, a function as the viewing-access-log recording server.

For this, the data trapping function (viewing-access-log obtaining function, publishing-access-log storing function) 72 fulfills the similar function to the data trapping function 22 described above. The data trapping function 72 also fulfills a function as a publishing-access-log obtaining function for obtaining inventive technique information transmitted from the information terminal 80 over the communication network 2 and notified in the inventive-technique publishing server 60, and an access-log of the information terminal 80 including a publishing date/time of the inventive technique information as a publishing-access-log (published information access-log, publishing access record evidence data group).

When the information terminal 30 (not shown in FIG. 15) or the information terminal 50 has a viewing access to the inventive-technique publishing server 60, or when the information terminal 80 has a publishing access to the inventive-technique publishing server 60, the data trapping function 72 traps the above-described various data as a viewing-access-log or a publishing-access-log from a data group (data group transmitted via or passing through the published information access-log recording server 70) exchanged between the information terminal 30, 50 or 80 and the inventive-technique publishing server 60 over the communication network 2.

As an access-log of the information terminal 80 included in the publishing-access-log, terminal information relating to the information terminal 80 having transmitted inventive technique information such as a communication network address, a name, an access route, identification information (contractant's ID) described above, etc. maybe further obtained.

The data storing function (viewing-access-log storing function, publishing-access-log storing function) 73 stores a viewing-access-log or a publishing-access-log trapped by the data trapping function 72, like the above-described data storing function 23. The viewing-access-log or the publishing-access-log maybe stored in the data storing function 73 in the original form at the time that the access-log has been trapped by the data trap 72. According to this embodiment, the access-log is stored in a form that the access-log has been subjected to the processing by the message-digest creating function 74, the enciphering function 75 and the third party digital-signature server 40 to be described later.

The message-digest creating function 74 creates a message digest of the inventive technique information trapped by the data trapping function 22 using algorithm such as MD5 (Message Digest algorithm 5) or the like. At this time, the message-digest creating function 74 may create message digests of all viewing-access-logs or publishing-access-logs.

At this time, the data storing function 73 may make a pair of a message digest of the inventive technique information and an access-log of the information terminal 30, 50 or 80, and store it as a viewing-access-log or a publishing-access-log, or store a message digest created from all viewing-access-logs or publishing-access-logs.

The enciphering function 75 enciphers a viewing-access-log or a publishing-access-log to be stored by the data storing function 73 using a secret key of the published information access-log recording server 70, thereby putting a digital signature to the viewing-access-log or the publishing-access-log.

At this time, the data storing function 73 may store a result of encipherment of a viewing-access-log or a publishing-access-log by the enciphering function 75 in a form at the time that the viewing-access-log or the publishing-access-log has been obtained by the data trapping function 72, or store a result of encipherment of a viewing-access-log or a publishing-access-log including a message digest created by the message-digest creating function 74. Further, the data storing function 73 may store a viewing-access-log or a publishing-access-log enciphered by the third party digital-signature server 40, as having been described in the fourth embodiment.

The published information access-log recording server 70 described above is configured with a computer such as a personal computer or the like. The data transmitting/receiving function 71, the data trapping function 72, the data storing function 73, the message-digest creating function 74 and the enciphering function 75 described above are accomplished by hardware or software on the computer.

According to this embodiment, the published information access-log recording server 70 has both a function as the viewing-access-log recording server and a function as the publishing-access-log recording server. Alternatively, these functions may be given to respective different servers.

Figure 16:
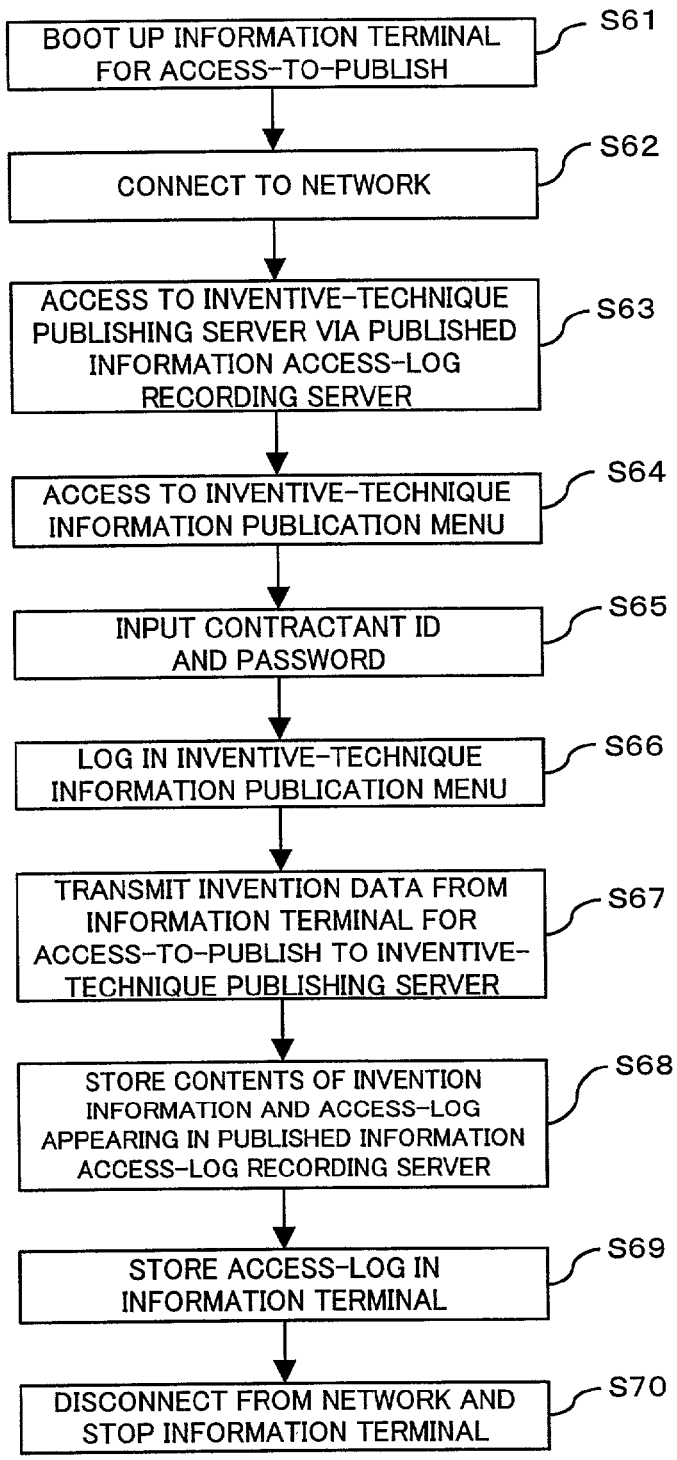
FIG. 16 is a flowchart for illustrating an operation according to the sixth embodiment.

Next, operations of the publication certifying system 1F, the inventive-technique publishing server 60 and the published information access-log recording server 70 in the above structures according to the sixth embodiment will be described with reference to a flowchart (steps S61 to S70) shown in FIG. 16.

Incidentally, a viewing access to inventive technique information notified and laid open in the inventive-technique publishing server 60 and a viewing-access-log (viewing-access-log record evidence data group) due to the viewing access are recorded and stored in the similar manner to the above-described embodiments, detailed description of which is thus omitted.

Consequently, a process (publishing access) of publishing inventive technique information in the inventive-technique publishing server 60 by a person who desires to publish the inventive technique information (a contractant having made a use contract with the administrator of the inventive-technique publishing server 60) will be here described in detail with reference to FIG. 16.

The person who desires to publish boots up the information terminal 80 for access-to-publish (step S61), connects it to the communication network 2 (step S62), accesses to the inventive-technique publishing server 60 via the published information access-log recording server 70 (step S63), and accesses to an inventive technique publication menu in the inventive-technique publishing server 60 (step S64)

The person who desires to notify inputs a contractant's ID and a password beforehand given according to an instruction of the inventive technique publication menu (step S65). When the inventive-technique publishing server 60 confirms on the basis of the inputted contractant's ID and password that the person who desires to publish is a contractant, the person who desires to publish logs in the inventive information publication menu (step S66).

The person who desires to publish transmits inventive technique information (invention data) that the person desires to publish in the inventive-technique publishing server 60 to the inventive-technique publishing server 60 from the information terminal 80 via the published information access-log recording server 70 (step S67).

At this time, the published information access-log recording server 70 and the third party digital-signature server 40 carry out the similar processes at step S35 to S37 and S41 to S46 shown in FIG. 9, for example. Whereby, contents of the inventive technique information and an access-log of the information terminal 80 including at least a publishing date/time are stored as a publishing-access-log (publishing access record evidence data) in the published information access-log recording server 70 (or the third party digital-signature server 40) (step S68).

After that, when the information terminal 80 stores an access-log of this publishing access (step S69), the person who desires to publish disconnects the information terminal 80 from the communication network 2 and stops it (step S70), and terminates a series of the process of the publishing access.

As above, the publication certifying system 1F, the inventive-technique publishing server 60 and the published information access-log recording server 70 according to the sixth embodiment of this invention provide the similar functions and effects to the first to fifth embodiments, along with the following functions and effects:

(a) Since contents and a publishing date/time of inventive technique information transmitted to and published in the inventive-technique publishing server 60 are recorded and stored as a publishing-access-log in the published information access-log recording server 70 or the third party digital-signature server 40, a notification history of the published information can be stored in a form provable by the publishing-access-log. It is thus possible to prove that the published information has been accessible as electronic data by anyone on the communication network (the Internet) 2 after the publishing date/time, that is, the electronic data has been published on the communication network 2. In consequence, it is possible to give admissibility similar to that of a printed matter or a published matter to information published on the communication network 2.

(b) Admissibility similar to that of a printed matter or a published matter can be given to electronic data as above, so that electronic data published on the communication network (the Internet) 2 can be adopted as an example of public knowledge in term of patent, for example.

In view of technical development, it becomes unnecessary for a company to apply patents or utility models of trivial ideas in afraid of other company acquiring the right since a service enabling information to be certainly published and certifying a publishing term of the information is provided as above. This realizes a reduction in patent application cost of the company and a reduction in load of the patent office.

(c) Since anonymous publishing service is possible, the client company can lay open a new technique as public knowledge information without revealing the development trend. Accordingly, the company or individual can leave a disclosure record of a technique that is uncertain to be granted a patent or not as public knowledge information, avoid such technique from being applied as a patent unreasonably, and decrease a cost of patent applications.

(d) Since inventive technique information is disclosed not on a paper basis as general technical published information but on an electronic basis, it is possible to immediately disclose the inventive technique information after the idea is made. It is therefore possible to largely decrease a time required until the inventive technique information is released when compared with general technical laid-open publications that are printed matters, and decrease a danger that the other applies the similar idea while the inventive technique information is prepared to be published.

(e) Use of the publication certifying system 1F as above enables the inventive-technique publishing server 60 to perform publishing access management of inventive technique information using a contractant's ID and a password. For example, it becomes possible to readily provide such a new information publishing service that information publication fee is charged and collected per one piece of published information, for example.

(f) Since the published information access-log recording server 70 has both functions as the viewing-access-log recording server and the publishing-access-log recording server, it becomes unnecessary to provide different two kinds of servers, which allows a more simple structure of the publication certifying system 1F.

[6-1] Description of Modification of Sixth Embodiment

A modification of the sixth embodiment is effective in more increasing anonymity of a person who publishes information when inventive technique information is published in the inventive-technique publishing server 60. The modification of the sixth embodiment provides a method in which a contractant purchases a prepaid card, and accesses to the inventive information bulletin function 63 of the inventive-technique publishing server 60 using identification information (ID) and a password described on the prepaid card. At this time, the inventive-technique publishing server 60 may count the number of accesses (information publication number) with the same ID, and stop log-in to the inventive-technique information bulletin function 63 when the count value reaches a predetermined number of times. In such case, it is desirable that the contractant beforehand sends inventive technique information to the third party digital-signature server or the electronic notary server, and receives a digital signature along with a time stamp.

Figure 17:
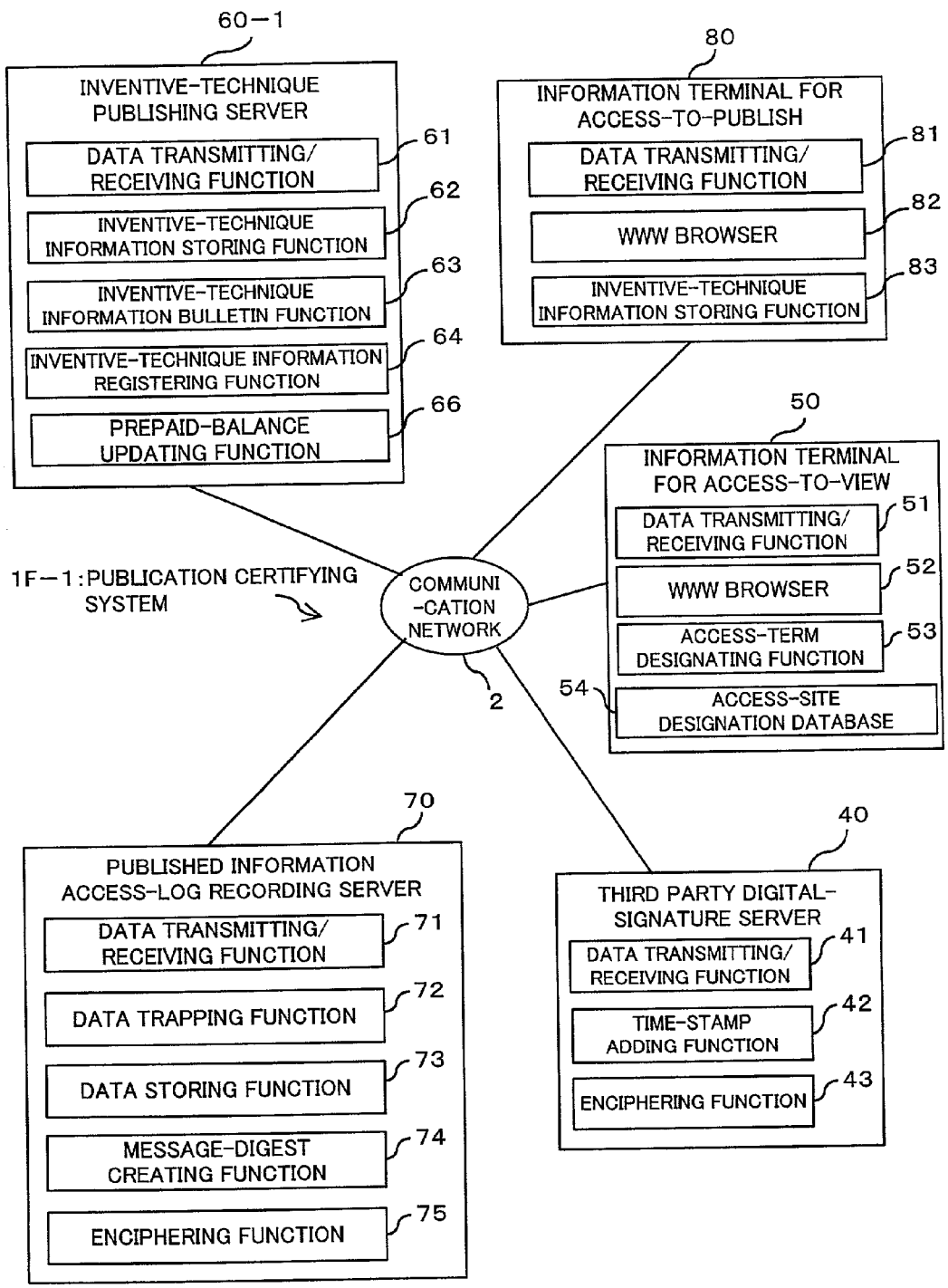
FIG. 17 is a block diagram showing a structure of a modification of the publication certifying system according to the sixth embodiment of this invention.

FIG. 17 is a block diagram showing a structure of the modification of the publication certifying system according to the sixth embodiment of this invention. In FIG. 17, like reference characters designate like or corresponding parts described above, detailed descriptions of which are thus omitted.

As shown in FIG. 17, the publication certifying system 1F-1 according to the modification of the sixth embodiment is configured almost similarly to the publication certifying system 1F according to the sixth embodiment. However, the publication certifying system 1F-1 is provided with an inventive-technique publishing server (information providing server) 60-1 instead of the inventive-technique publishing server 60 according to the sixth embodiment. The inventive-technique publishing server 60-1 comprises a prepaid-balance updating function 66 instead of the charge information updating function 65, along with a data transmitting/receiving function 61, an inventive-technique information storing function 62, an inventive-technique information bulletin function 63 and an inventive-technique information registering function 64 similar to those according to the sixth embodiment.

In the publication certifying system 1F-1, the administrator of the inventive-technique publishing server 60 beforehand issues a prepaid card on which identification information (ID) and a password are described, and a person who desires to publish inventive technique information beforehand purchases the prepaid card.

The inventive-technique information registering function 64 according to this modification confirms that identification information (ID) and a password transmitted from the information terminal 80 are described on a prepaid card that has been already issued and whose amount of time does not reach the full amount of time, thereby confirming a person who desires to publish. After that, the inventive-technique information registering function 64 registers inventive technique information transmitted from the information terminal 80 in the inventive-technique information storing function 62 to store and publish the inventive technique information.

The prepaid-balance updating function 66 makes a balance (a remaining number of times of use) of the prepaid card correspond to and associate with the number of times the inventive technique information is published in the inventive-technique publishing server 60. The prepaid-balance updating function 66 may count the number of times of access (the number of times information is notified) with the same ID, as described above. In such case, the inventive-technique information registering function 64 operates to stop log-in to the inventive-technique information bulletin function 63 when the count value reaches a predetermined number of times.

Next, an operation of the publication certifying system 1F-1 in the above structure according to the modification of the sixth embodiment will be described with reference to a flowchart (steps S71 to S83) shown in FIG. 18.

In the publication certifying system 1F-1, the administrator of the inventive-technique publishing server 60 issues a prepaid card on which identification information (ID) and a password are described, as stated above. A person who desires to publish inventive technique information purchases a prepaid card (step S71) to obtain ID and a password (step S72)

The person who desires to notify boots up the information terminal 80 (step S73), connects it to the communication network 2 (step S74), accesses to the inventive-technique publishing server 60 via the published information access-log recording server 70 (step S75), and accesses to the inventive technique publication menu of the inventive-technique publishing server 60 (step S76).

The person who desires to publish inputs the ID and password described on the purchased prepaid card according to an instruction of the inventive technique publication menu (step S77). When the inventive-technique publishing server 60 confirms that the inputted ID and password are described on a prepaid card that has been already issued and has not yet been used the full amount of time, the person who desires to publish logs in the inventive information publication menu (step S78).

The person who desires to notify then transmits inventive technique information (invention data) desired to be published in the inventive-technique publishing server 60 from the information terminal 80 to the inventive-technique publishing server 60 via the published information access-log recording server 70 (step S79). When inventive-technique information registering function 64 registers the inventive technique information in the inventive-technique information storing function 62, the prepaid-balance updating function 66 updates the balance such as to decrease a remaining balance (a remaining number of times of use) of a prepaid card to which the above ID is given in the inventive-technique publishing server 60 (step S80).

At this time, the published information access-log recording server 70 and the third party digital-signature server 40 carry out the similar processes at step S35 to S37 and S41 to S46 shown in FIG. 9, for example, whereby contents of the inventive technique information and an access-log of the information terminal 80 including at least a publishing date/time are stored as a publishing-access-log (publishing access record evidence data group) in the published information access-log recording server 70 (or the third party digital-signature server 40) (step S81).

After that, when the information terminal 80 stores an access-log of this publishing access (step S82), the person who desires to publish disconnects the information terminal 80 from the communication network 2 and stops it (step S83), then terminates a series of the process of the publishing access.

According to the publication certifying system 1F-1 as above, it is possible to publish inventive technique information in the inventive-technique publishing server 60 while keeping high anonymity of a person who desires to publish, after a publication fee for the inventive technique information is collected. It is therefore possible to provide a service of anonymous information publication.

[7] Others

Note that the present invention is not limited to the above examples, but may be modified in various ways without departing from the scope of the invention.

For instance, the above sixth embodiment has been described by way of example where the published information is inventive technique information. However, this invention is not limited to this example.

What is claimed is:

1. A publication certifying system, comprising:
an information providing server including a published information storing function of storing published information to be provided as electronic data, and a published information bulletin function of providing the published information to an information terminal accessing over a communication network in order to view the published information;
a viewing-access-log recording server including a viewing-access-log obtaining function of obtaining the published information viewed on said information terminal over the communication network and an access date/time to the published information as a viewing-access-log, and a viewing-access-log storing function of storing the viewing-access-log obtained by the viewing-access-log obtaining function; and
a publishing-access-log recording server including a publishing-access-log obtaining function of obtaining the published information and a publishing date/time of the published information as a publishing-access-log when information is published in said information providing server over the communication network and published as the published information, and a publishing-access-log storing function of storing the publishing-access-log obtained by the publishing-access-log obtaining function.

2. The publication certifying system according to claim 1, wherein the viewing-access-log obtaining function further obtains terminal information about said information terminal having accessed to the published information as the viewing-access-log.

3. The publication certifying system according to claim 1, wherein said viewing-access-log recording server further comprises a message-digest creating function of creating a message digest of the published information obtained by the viewing-access-log obtaining function; and
the viewing-access-log storing function stores the message digest as the published information in the viewing-access-log.

4. The publication certifying system according to claim 1, wherein
one server fulfils both a function as said information providing server and a function as said viewing-access-log recording server.

5. The publication certifying system according to claim 1, wherein
said viewing-access-log recording server further comprises an enciphering function of enciphering the viewing-access-log to be stored by the viewing-access-log storing function using a secret key of said viewing-access-log recording server to put a digital signature to the viewing-access-log.

6. The publication certifying system according to claim 1 further comprising a digital-signature server comprising a time-stamp adding function of adding a time stamp to the viewing-access-log, and an enciphering function of enciphering the viewing-access-log added the time stamp thereto using a predetermined secret key to put a digital signature to the time-stamped viewing-access-log; and
the viewing-access-log storing function storing the time-stamped viewing-access-log to which the digital signature has been put by said digital-signature server.

7. The publication certifying system according to claim 1 further comprising a digital-signature server comprising a time-stamp adding function of adding a time stamp to the viewing-access-log, an enciphering function of enciphering the viewing-access added the time stamp using a predetermined secret key to put a digital signature to the time-stamped viewing-access-log, and a viewing-access-log storing function of storing the time-stamped viewing-access-log to which the digital signature has been put by the enciphering function.

8. The publication certifying system according to claim 1 further comprising at least one information terminal for access-to-view for periodically having an access of viewing the published information in said information providing server in order to intentionally leave a log of the access of viewing the published information in said viewing-access-log recording server.

9. The publication certifying system according to claim 8, wherein a plurality of said information terminals for access-to-view are disposed in a plurality of countries, respectively.

10. The publication certifying system according to claim 8, wherein said information terminal for access-to-view is connected with the communication network via a server of an Internet service provider.

11. The publication certifying system according to claim 1, wherein a proxy server of an Internet service provider comprises a function as said viewing-access-log recording server.

12. The publication certifying system according to claim 1, wherein a person, who desires to publish information, transmits identification information and a password beforehand given to the person to said information providing server over the communication network, and said information providing server confirms the person on the basis of the identification information and the password, then stores and publishes the information as the published information.

13. The publication certifying system according to claim 12, wherein the identification information and the password are described on a prepaid card purchased by the person.

14. The publication certifying system according to claim 13, wherein a remaining amount of time of the prepaid card corresponds to the number of times information is published in said information providing server.

15. The publication certifying system according to claim 1, wherein the viewing-access-log recording server executes a function as said publishing-access-log recording server, the viewing-access-log obtaining function executes the publishing-access-log obtaining function, and the viewing-access-log storing function executes the publishing-access-log storing function.

16. The publication certifying system according to claim 1, wherein the viewing-access-log storing function stores the published information included in the viewing-access-log in a compressed form.

17. A published information access-log recording servers, comprising:
a viewing-access-log obtaining function of obtaining published information viewed over a communication network and an access date/time to the published information as a viewing-access-log;
a viewing-access-log storing function of storing the viewing-access-log obtained by the viewing-access-log obtaining function;
a publishing-access-log obtaining function of obtaining the published information and a publishing date/time of the published information as a publishing-access-log when information is published in an information providing server over the communication network and published as the published information; and
a publishing-access-log storing function of storing the publishing-access-log obtained by the publishing-access-log obtaining function.

18. The published information access-log recording server according to claim 17, wherein the viewing-access-log obtaining function further obtains terminal information about an information terminal having accessed to the published information as the viewing-access-log.

19. The published information access-log recording server according to claim 17 further comprising a message-digest creating function of creating a message digest of the published information obtained by the viewing-access-log obtaining function; and
the viewing-access-log storing function storing the message digest as the published information in the viewing-access-log.

20. The published information access-log recording server according to claim 17 further comprising an enciphering function of enciphering the viewing-access-log to be stored by the viewing-access-log storing function using a secret key of said published information access-tog recording server to put a digital signature to the viewing-access-log.

21. A publishing-access-log recording servers comprising:
a publishing-access-log obtaining function of obtaining information transmitted to and published in an information providing server over a communication network and a publishing date/time of the information as a publishing-access-log; and
a publishing-access-log storing function of storing the publishing-access-log obtained by the publishing-access-log obtaining function.

22. A digital-signature server configuring a publication certifying system with an information providing server comprising a published information storing function of storing published information to be provided as electronic data, and a published information bulletin function of providing the published information to an information terminal accessing over a communication network in order to view the published information, a viewing-access-log recording server comprising a viewing-access-log obtaining function of obtaining the published information viewed on said information terminal over the communication network and an access date/time to the published information as a viewing-access-log, and a viewing-access-log storing function of storing the viewing-access-log obtained by the viewing-access-log obtaining function; and
a publishing-access-log recording server including a publishing-access-log obtaining function of obtaining the published information and a publishing date/time of the published information as a publishing-access-log when information is published in said information providing server over the communication network and published as the published information, and a publishing-access-log storing function of storing the publishing-access-log obtained by the publishing-access-log obtaining function said digital-signature server comprising:
a time-stamp adding function of adding a time stamp to the viewing-access-log; and
an enciphering function of enciphering the viewing-access-log added the time stamp using a secret key of said digital-signature server to put a digital signature to the time-stamped viewing-access-log.

23. The digital-signature server according to claim 22 further comprising:
a viewing-access-log storing function of storing the time-stamped viewing-access-log to which the digital signature has been put by the enciphering function.

24. An information terminal for access-to-view configuring a publication certifying system with an information providing server comprising a published information storing function of storing published information to be provided as electronic data, and a published information bulletin function of providing the published information to said information terminal accessing over a communication network in order to view the published information, a viewing-access-log recording server comprising a viewing-access-log obtaining function of obtaining the published information viewed on said information terminal over the communication network and an access date/time to the published information as a viewing-access-log, and a viewing-access-log storing function of storing the viewing-access-log obtained by the viewing-access-log obtaining function, and a publishing-access-log recording server including a publishing-access-log obtaining function of obtaining the published information and a publishing date/time of the published information as a publishing-access-log when information is published in said information providing server over the communication network and published as the published information, and a publishing-access-log storing function of storing the publishing-access-log obtained by the publishing-access-log obtaining function;
said information terminal for access-to-view periodically having an access of viewing the published information in said information providing server in order to intentionally leave a log of the access of viewing the published information in said viewing-access-log recording server.

25. A publication certifying system, comprising:
an information providing server including a published information storing function of storing published information to be provided as electronic data, and a published information bulletin function of providing the published information to an information terminal accessing over a communication network in order to view the published information; and
a viewing-access-log recording server including a viewing-access-log obtaining function of obtaining the published information viewed on said information terminal over the communication network and an access date/time to the published information as a viewing-access-log, and a viewing-access-log storing function of storing the viewing-access-log obtained by the viewing-access-log obtaining function; and
wherein a person, who desires to publish information, transmits identification information and a password provided to the person to said information providing server over the communication network, and said information providing server confirms the person on the basis of the identification information and the password, and stores and publishes the information as the published information, the identification information and the password are described on a prepaid card purchased by the person; and a remaining amount of time of the prepaid card corresponds to the number of times information is published in said information providing server.

* * * * *

UNITED STATES PATENT AND TRADEMARK OFFICE
CERTIFICATE OF CORRECTION

PATENT NO. : 6,978,024 B2
DATED : December 20, 2005
INVENTOR(S) : Takashi Shinzaki It is certified that error appears in the above-identified patent and that said Letters Patent is hereby corrected as shown below:

<u>Column 28,</u>
Line 53, delete "the" and insert -- said --.
Line 63, delete "servers" and insert -- server --.

<u>Column 29,</u>
Line 32, delete "access-tog" and insert -- access-log --.
Line 35, delete "servers" and insert -- server --.

Signed and Sealed this

Sixth Day of June, 2006

JON W. DUDAS
*Director of the United States Patent and Trademark Office*